United States Patent
de los Reyes Darias et al.

(10) Patent No.: US 10,250,709 B2
(45) Date of Patent: Apr. 2, 2019

(54) DATA PROCESSING APPARATUS, CONTROLLER, CACHE AND METHOD

(71) Applicant: ARM Limited, Cambridge (GB)

(72) Inventors: Jesus Javier de los Reyes Darias, Littleport (GB); Hakan Persson, Bjarred (SE); Roko Grubisic, Fulbourn (GB); Vinod Pisharath Hari Pai, Cambridge (GB)

(73) Assignee: Arm Limited, Cambridge (GB)

( * ) Notice: Subject to any disclaimer, the term of this patent is extended or adjusted under 35 U.S.C. 154(b) by 411 days.

(21) Appl. No.: 15/099,244

(22) Filed: Apr. 14, 2016

(65) Prior Publication Data
US 2016/0323407 A1 Nov. 3, 2016

(30) Foreign Application Priority Data
Apr. 28, 2015 (GB) .................................. 1507190.5

(51) Int. Cl.
| H04L 12/18 | (2006.01) |
|---|---|
| H04L 12/54 | (2013.01) |
| H04L 29/06 | (2006.01) |
| H04L 29/08 | (2006.01) |
| H04L 12/861 | (2013.01) |

(Continued)

(52) U.S. Cl.
CPC ...... *H04L 67/2842* (2013.01); *G06F 12/0808* (2013.01); *G06F 12/0891* (2013.01); *H04L 12/184* (2013.01); *H04L 12/1877* (2013.01); *H04L 12/5691* (2013.01); *H04L 49/90* (2013.01); *H04L 69/14* (2013.01); *G06F 12/0811* (2013.01); *G06F 12/0813* (2013.01); *G06F 2212/1024* (2013.01);

(Continued)

(58) Field of Classification Search
CPC .................................................. H04L 67/2842
See application file for complete search history.

(56) References Cited

U.S. PATENT DOCUMENTS

| 5,752,275 A | 5/1998 | Hammond |
| 5,812,815 A * | 9/1998 | Yazdy ................. G06F 12/0831 |
| | | 711/118 |

(Continued)

FOREIGN PATENT DOCUMENTS

| EP | 0448205 | 9/1991 |
| EP | 0 764 905 | 3/1997 |
| WO | WO 81/01894 | 7/1981 |

OTHER PUBLICATIONS

Chang-Kyu Lee, Jong Hyuk Choi, Kyu Ho Park and Bong Wan Kim, "Fast and cost effective cache invalidation in DSM," Parallel and Distributed Systems, 2000. Proceedings. Seventh International Conference on, Iwate, 2000, pp. 492-497. doi: 10.1109/ICPADS. 2000.857734.

(Continued)

*Primary Examiner* — Michael A Keller
*Assistant Examiner* — Austin J Moreau
(74) *Attorney, Agent, or Firm* — Leveque IP Law, P.C.

(57) ABSTRACT

A data processing apparatus has multiple caches and a controller for controlling the caches. The controller and caches communicate over a first network and a second network. The first network is used for unicast communication from the controller to a specific one of the caches. The second network is used for communication of a multicast communication from the controller to two or more of the caches.

23 Claims, 16 Drawing Sheets

(51) Int. Cl.
  *G06F 12/0808* (2016.01)
  *G06F 12/0811* (2016.01)
  *G06F 12/0813* (2016.01)
  *G06F 12/0891* (2016.01)
(52) U.S. Cl.
  CPC .. *G06F 2212/681* (2013.01); *G06F 2212/683* (2013.01); *Y02D 10/13* (2018.01); *Y02D 50/30* (2018.01)

(56) References Cited

U.S. PATENT DOCUMENTS

| | | | |
|---|---|---|---|
| 5,966,728 A * | 10/1999 | Amini | G06F 12/0835 711/146 |
| 6,112,285 A | 8/2000 | Ganapathy et al. | |
| 2002/0042861 A1 | 4/2002 | Kavipurapu | |
| 2002/0099913 A1 * | 7/2002 | Steely, Jr. | G06F 12/0897 711/122 |
| 2003/0014609 A1 | 1/2003 | Kissell | |
| 2004/0002992 A1 | 1/2004 | Cypher et al. | |
| 2005/0044174 A1 * | 2/2005 | Landin | G06F 12/0817 709/217 |
| 2008/0299052 A1 | 9/2008 | Ozer et al. | |
| 2008/0256300 A1 | 10/2008 | Lee et al. | |
| 2008/0288742 A1 | 11/2008 | Hepkin et al. | |
| 2008/0320236 A1 | 12/2008 | Ueda et al. | |
| 2011/0022754 A1 * | 1/2011 | Cidon | G06F 15/7825 710/107 |
| 2012/0096213 A1 | 4/2012 | Kato | |
| 2013/0212585 A1 * | 8/2013 | Tran | G06F 9/30189 718/102 |
| 2014/0164732 A1 * | 6/2014 | Muff | G06F 12/1027 711/207 |
| 2014/0281263 A1 | 9/2014 | Deming et al. | |

OTHER PUBLICATIONS

Bilir, E. Ender, et al. "Multicast snooping: a new coherence method using a multicast address network." ACM SIGARCH Computer Architecture News 27.2 (1999): 294-304.

Shafiee, Ali, Narges Shahidi, and Amirali Baniasadi. "Using partial tag comparison in low-power snoop-based chip multiprocessors." Computer Architecture. Springer Berlin Heidelberg, 2010.

* cited by examiner

DATA PROCESSING APPARATUS, CONTROLLER, CACHE AND METHOD

TECHNICAL FIELD

The present technique relates to the field of data processing. More particularly, it relates to control of multiple caches in a data processing apparatus.

BACKGROUND

A data processing apparatus may have a number of caches and a central controller may be provided for controlling the caches. For example the controller may manage coherency between the caches, or may handle requests from the caches for data to be fetched from a memory for example.

SUMMARY

At least some examples provide a data processing apparatus comprising:
 a plurality of caches;
 a controller configured to control the plurality of caches;
 a first network coupling the controller and the plurality of caches; and
 a second network coupling the controller and the plurality of caches;
 wherein the controller is configured to transmit a unicast communication to a specified one of the plurality of caches via the first network; and
 the controller is configured to transmit a multicast communication to at least two of the plurality of caches via the second network.

At least some examples provide a controller for controlling a plurality of caches of a data processing apparatus, comprising:
 a first network interface configured to output a unicast communication to a specified one of the plurality of caches via a first network; and
 a second network interface configured to output a multicast communication to at least two of the plurality of caches via a second network.

At least some examples provide a cache comprising:
 a first network interface configured to receive a unicast communication from a controller via a first network, the unicast communication comprising a type of communication for which said cache is the only recipient; and
 a second network interface configured to receive a multicast communication from the controller via a second network, the multicast communication comprising a type of communication for which recipients include said cache and at least one other cache.

At least some examples provide a data processing apparatus comprising:
 a plurality of means for caching data;
 means for controlling the plurality of means for caching data;
 first network means for coupling the means for controlling and the plurality of means for caching data; and
 second network means for coupling the means for controlling and the plurality of means for caching data;
 wherein the means for controlling is configured to transmit a unicast communication to a specified one of the plurality of means for caching data via the first network means; and
 the means for controlling is configured to transmit a multicast communication to at least two of the plurality of means for caching data via the second network means.

At least some examples provide a controller for controlling a plurality of caches of a data processing apparatus, comprising:
 first network interface means for outputting a unicast communication to a specified one of the plurality of caches via a first network; and
 second network interface means for outputting a multicast communication to at least two of the plurality of caches via a second network.

At least some examples provide a cache comprising:
 first network interface means for receiving a unicast communication from a controller via a first network, the unicast communication comprising a type of communication for which said cache is the only recipient; and
 second network interface means for receiving a multicast communication from the controller via a second network, the multicast communication comprising a type of communication for which recipients include said cache and at least one other cache.

At least some examples provide a data processing method comprising:
 transmitting a unicast communication from a controller to a specified one of a plurality of caches via a first network coupling the controller and the plurality of caches; and
 transmitting a multicast communication to at least two of the plurality of caches via a second network coupling the controller and the plurality of caches.

BRIEF DESCRIPTION OF THE DRAWINGS

Further aspects, features and advantages of the present technique will be apparent from the following description of examples, which is to be read in conjunction with the accompanying drawings, in which.

DETAILED DESCRIPTION

Figure 1:
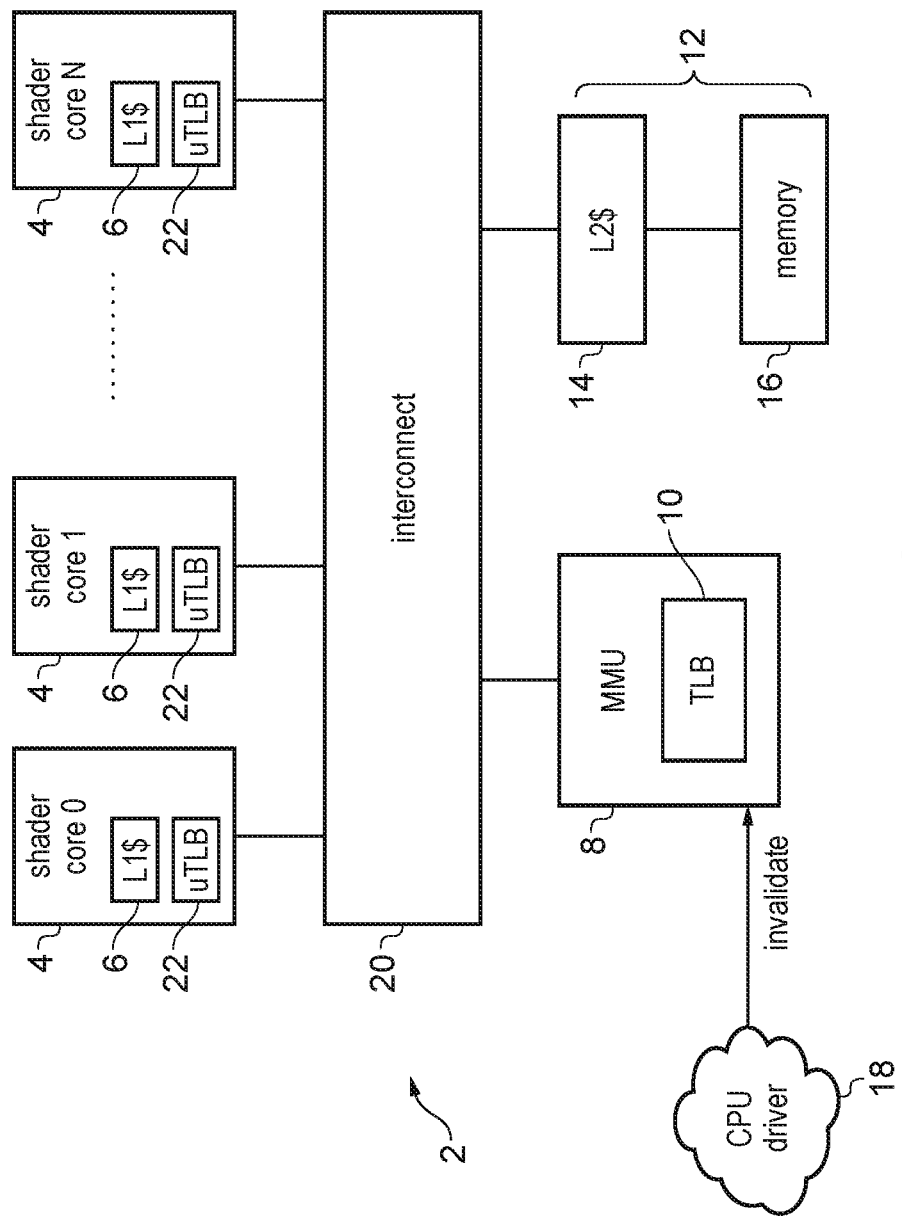
FIG. 1 schematically illustrates an example of a data processing apparatus having multiple caches and a controller.

A data processing apparatus (such as an integrated circuit or system on chip) may include a number of caches and a central controller for controlling the caches. The caches may be coupled to the controller via a communication network. Most of the communications issued by the controller may be unicast communications, which target a specific one of the caches. However, sometimes it may be required to issue a multicast communication where the controller transmits the same signal to two or more of the caches. A first network is provided for transmitting unicast communications between the controller and a specified one of the caches, and a second network for transmitting a multicast communication from the controller to at least two of the caches.

One may find it counter-intuitive to provide a second network for multicast communications when the first network could already be used to achieve the same functionality by routing a unicast message to each target cache. However, the inventors recognised that in a system with distributed caches, often the network connecting the controller to each cache does not support multicast communication modes, and adding such modes to the network increases the complexity of the system and can increment exponentially the verification effort to avoid functional bugs and deadlock situations, as well as making it harder for the system to scale efficiently with increasing numbers of caches. These problems can be avoided by providing separate networks for unicast and multicast communications. Also, whereas reusing the unicast network for multicast communications could result in many of the available routes for passing communications to each cache being blocked for the multicast communication, which would delay servicing of other unicast communications, with the second network the routing of multicast messages does not impact on performance in servicing unicast messages. Also, a separate network for multicast communications may use a simpler multicast protocol which does not need to mirror the protocol used for unicast messages on the first network, which can simplify the handling of multicast communications. Therefore, although the second network may require a little additional circuitry, this may be compensated for by the improved performance and reduced development overhead of providing the system as a whole.

In some cases the second network may be able to route multicast communications to a specified subset of the caches (not all of the caches). The controller could specify which particular caches are to be targeted with the multicast communication.

However, for some types of communication the additional overhead of being able to select particular subsets of caches for a multicast communication may not be justified. Hence, in some cases the multicast communication may be a broadcast communication which is communicated to each of the caches over the second network. In general, references to "multicast" in this application should be interpreted as including "broadcast".

In some examples the first network may comprise a switch network which provides multiple communication paths between the controller and any given cache. Hence, when one communication path is blocked because it already being used for providing a signal over the network, the switch network may select another path for routing a signal to the target cache. If such a switch network was also used for multicast communication, then when a multicast message is sent, this could block a significant number (or even all) of the communication paths available for communicating with a given cache, so that other communications are delayed. This can be avoided by providing a second network dedicated for multicast communications.

In some cases the second network may provide asynchronous communication between the controller and the plurality of caches. This avoids the need for clock synchronization between the controller and the caches. The second network may have a relatively simple handshake protocol between the controller and each cache to ensure that the states of the controller and cache are consistent. In some cases the first network may also provide asynchronous communication.

The first network may be used for any unicast communication from the controller to a specific cache, or from a specific cache to the controller. For example, when required data is not present in a given cache, that cache may issue a cache refill request over the first network to the controller to request that the controller fetches the required data from an internal cache within the controller or another storage device such as main memory. When the controller has the required data, the controller may issue a cache refill response over the first network which provides the requested data to the cache which requested it. Other example of a unicast communication may include cache maintenance requests to clean or invalidate data from a particular cache.

On the other hand, the multicast communication sent on the second network may include any type of communication which is to be routed to multiple caches simultaneously. Often this may be useful for communications for ensuring coherency or synchronisation of data stored in multiple caches. For example, the multicast communication may comprise a cache invalidation request for requesting invalidation of at least some data stored in at least two caches.

In some examples the second network may be dedicated to handling cache invalidation requests and the responses to such requests, and may not be used for other types of communication. By separating cache invalidation requests from the network used for general unicast cache communications, this avoids cache invalidation requests blocking a large number of paths on the unicast network, and makes the overall system more efficient to implement and develop for the reasons given above. Separating invalidations into a second network may be particularly useful for systems in which data stored in a main data store may be updated independently from the data in the caches themselves. In such a system, an update to the data in the main data store may trigger an invalidation request from the controller to each cache to maintain coherency of the cached data.

The second network may include various signal channels for routing signals for handling cache invalidations. In one example, the second network may include a request channel for sending a cache invalidation request to each of the at least two caches, and a response channel for each of the caches to transmit a cache invalidation response back to the controller to acknowledge the cache invalidation request.

In one example the controller may detect whether each of the at least two caches has transmitted the cache invalidation response in response to the cache invalidation request. When each of the cache has transmitted the response, the controller may deassert the cache invalidation request. This ensures that the cache invalidation request remains pending until each cache has acknowledged it.

When the cache invalidation request is received by a particular cache then this may trigger the cache to perform an invalidation process. As well as invalidating the data in the cache, the invalidation process may also include further steps to ensure coherency, which may vary depending on the particular coherency protocol used by the cache and the system as a whole. There may still be some outstanding cache refill requests which have already been issued to the controller, for which responses have not been received. Therefore, in some cases the invalidation process may include steps for ensuring that data returned from the controller for such requests is not cached, as this could be out of date following the invalidation. The sending of the cache invalidation response may take place at any stage of this invalidation process (e.g. before starting the invalidation process, at a predetermined point of the invalidation process, or when the invalidation process is complete).

If the invalidation response is sent by the cache before the end of the invalidation process, the cache may deassert the cache invalidation response once it has completed the invalidation process in response to the cache invalidation request, to signal to the controller that it has successfully completed the invalidation process.

The controller may defer issuing any further cache invalidation requests on the second network until each of the two or more caches has deasserted the cache invalidation response. This may make implementation of the caches simpler since the cache needs only have resources for tracking the completion of a single invalidation process at a time. For example, as mentioned above the invalidation process may include tracking of responses to cache refill requests which were outstanding at the time of receiving the invalidation request. If multiple invalidation requests could be pending simultaneously, the cache may need to distinguish which requests were pending at the time of each invalidation request. This overhead may not be justified if invalidations do not happen frequently. Therefore, it may be more efficient for the controller to simply defer issuing any further cache invalidation request on the second network until each of the caches has completed a previous invalidation process.

The second network and/or the controller may include some logic for combining the cache invalidation responses from each cache to determine when each cache has asserted or deasserted the response. For example, the logic may include an AND gate which combines each response in a logical AND operation to provide a signal indicating whether all of the responses are high, and/or an OR gate which combines each response in a logical OR operation to provide a signal indicating whether all of the responses are low.

The controller may have its own local cache which stores data which may be provided to the other caches when requested. For some types of invalidation request, when invalidating data in the caches over the second network, the controller may also invalidate corresponding data in its own cache. For other types of invalidation request, the data may only be invalidated in the distributed caches and not in the controller. Some systems may support both types of invalidation, while other systems may only support one of these types.

Some caches may be able to operate in a power saving state to reduce power consumption. At this time, the cache's control logic for controlling cache invalidations may also be powered down, and so may not be able to respond to cache invalidation requests in the usual way. If the controller is waiting for the cache to acknowledge the cache invalidation request before proceeding with other operations, this may cause a delay, which may be unnecessary since when the cache is in the power saving state, it may not be storing any valid data which would need to be invalidated. To avoid such delays, at least one of the caches may be provided with response generating circuitry which can automatically generate the cache invalidation response in response to the cache invalidation request when the cache is in the power saving state. For example, when the cache enters the power saving state, the response generating circuitry could couple together the signal lines for receiving the cache invalidation request and transmitting the cache invalidation response, so that any assertion/deassertion of the request signal results in a corresponding assertion/deassertion of the response signal.

In some embodiments, the invalidation request/response signals may be the only communications over the second network. However, it is also possible for the second network to comprise further channels for providing other kinds of information. For example the second network may have a channel for providing identification information along with the cache invalidation request, which identifies which particular data is to be invalidated. Hence, rather than simply invalidating all the data in the caches, each cache can identify particular cache lines which store data corresponding to the identification information and then invalidate these lines while leaving other lines valid. For example the identification information could identify an address or group of addresses of data to be invalidated, or an address space or context for which data is to be invalidated.

The cache invalidation requests may be triggered by various events. For example, following resetting of the apparatus or powering up of the apparatus, the controller may trigger an invalidation of each of the caches to ensure that data which may be in the caches following reset or power up is not accidentally interpreted as valid data.

In another example, the invalidation may be triggered by an invalidation control signal received by the controller from another device, e.g. triggered by software executing on a processing unit. For example, where the caches cache subsets of data from a common data store, the caches may be invalidated when there is a change to the data in the common data store. For example, an external circuit could have control over the data in the common data store, and when changing this data, the other device may provide the invalidation control signal signal to the controller. To maintain coherency in the caches, the controller may issue the invalidation request on the second network to each of the caches.

Sometimes while processing one invalidation, a further invalidation control signal may be received from the other device. However, if at this point not all of the caches have acknowledged the original invalidation request by transmitting the invalidation response, the invalidation process for the original invalidation request is still to be completed and so this can also be enough to service the second invalidation. Therefore, the controller may suppress issuing of a further cache invalidation request in response to the further control signal, to avoid the overhead and performance impact of unnecessarily processing an additional invalidation event.

Cache access requests are requests to access data in a cache (e.g. issued by a processing unit accessing the cache). If the required data is not present in the cache, this may trigger a cache refill request to be sent to the controller on the first network. If the controller has the data locally, it may be respond with a cache refill response on the first network. If the controller does not have the data cached locally, it may issue a linefill request to a further data store such as main memory.

Hence, at the point when the invalidation takes place using the second network, there may be various requests pending at different points of the system, including cache access requests pending in the cache while awaiting cache refill responses, cache refill requests travelling through the first network to the controller, cache refill requests pending in the controller while awaiting linefill responses from the further data store, and linefill requests pending being serviced by the further data store. The following protocol may be used by the controller and the cache to ensure that outstanding requests at the time of an invalidation are eventually serviced and out of date data is not used following the invalidation:

The controller may continue to provide cache refill responses in response to cache refill requests that are pending at the time of issuing the cache invalidation requests (even responding to cache refill requests received after the cache invalidation request which may have been travelling through the first network at the time the cache invalidation request was issued).

The controller may also discard any data received from the further data store in response to linefill requests that were outstanding at the time of the invalidation request The caches may each identify any outstanding cache refill requests for which responses have not yet been received at the time of receiving the invalidation request (e.g. by marking such requests with a "discard" flag). When responses to such requests are received, the data returned in the cache refill response may be discarded. Also, these outstanding cache refill requests may be reissued to the controller (but this time not marked with the "discard" flag), to ensure that all the requests end up being serviced.

It may seem counter-intuitive to allow the controller to respond to pending cache refill requests following the invalidation request which could potentially lead to out of date data being provided to the cache. However, to ensure that no requests end up "lost" in the system and not being serviced, it can be safer for the controller to respond to all cache refill requests and the cache to control which responses are discarded.

The present technique can be applied to any system in which there are multiple caches and a network is used to communicate between a controller and the caches.

The technique can be particularly useful for a system comprising a number of translation lookaside buffers (TLB) for storing address translation data. For example, some systems such as a graphics processing unit (GPU) may have a number of smaller processing units which each may have their own TLB for caching address translation local to that processing unit to reduce the delay of address translation compared to accessing a central TLB. The TLBs within each processing unit may be called a micro-TLB (uTLB). Some systems may have as many as 16 such uTLBs. A memory management unit (MMU) may manage the transfer of page table entries between each uTLB and page tables which may be located within main memory for example. If the page tables in main memory are reconfigured, the MMU may issue an invalidation request for invalidating page table entries in the uTLBs which may now be out of date. Hence, the caches referred to above may correspond to the uTLBs and the controller may correspond to the MMU. The first network may be used for page table entry requests from the uTLBs to the MMU and the response of the MMU providing the requested page table entry, and the second network may be used for uTLB invalidation requests and responses.

The data processing apparatus may comprise an integrated circuit or system on chip.

FIG. 1 schematically illustrates an example of a data processing apparatus 2. In this example the apparatus 2 is a graphics processing unit (GPU) for performing graphics processing operations. The apparatus includes a number of processing units 4 referred to as shader cores. Three shader cores 4 are shown in FIG. 1, but more generally there may be N shader cores (e.g. N=4, 8 or 16). A GPU 2 is typically responsible for rendering of a frame of an image which may comprise a number of pixels. For each pixel or block of adjacent pixels, the GPU 2 may execute a corresponding thread of processing, with each thread comprising substantially the same set of operations but using different input data. By providing multiple shader cores 4, a number of the threads can be processed in parallel to improve performance. Each shader core 4 may have a level one (L1) cache 6 for caching data used for processing the current thread. For example the cached data may include input data defining coordinates of fragments or shapes to be rendered, texture data defining how to fill areas within the fragments or shapes, or any other information used to determine the pixel values within the block of pixels being processed by that thread. Data may be fetched into the L1 cache 6 from a memory system 12 when required data is not already cached. The memory system may comprise a level two cache 14 and a main memory 16 and may optionally include further levels of cache or memory not shown in FIG. 1.

The shader core 4 may use virtual addresses to identify data to be accessed. On the other hand, the L1 cache 6 may be a physically addressed cache which uses physical addresses to identify data. Therefore, the system is provided with address translation functionality which is managed by a memory management unit (MMU) 8. The MMU has a translation lookaside buffer (TLB) 10 which caches translation data common to all of the shader cores 4. Page tables are maintained in the memory system 12. The page tables are typically maintained by software executing on a further processing device such as a central processing unit. For example the software may comprise a CPU driver or operating system 18. The page tables in the memory system 12 comprise a number of page table entries (PTEs), each defining an address mapping for a corresponding page of addresses. Each PTE may also define access permissions for the corresponding page of addresses. The TLB 10 in the MMU provides a cache of a number of recently used PTEs from the page tables in the memory 12 so that data can be accessed more quickly than if they had to be fetched from memory all the time.

If the shader cores 4 had to request translations from the MMU 8 each time an address translation is required, this would slow down the operation of each shader core 4 since there would be contention for space in the TLB 10 and there would be a delay in handling requests travelling over an interconnect 20 coupling the shader cores 4 to the MMU 8. To speed up address translation, each shader core 4 may have a local TLB, known as a micro-TLB (uTLB) 22. Effectively the uTLB 22 acts as a small cache of recently seen PTEs which the shader core 4 can access more quickly than the TLB 10 in the MMU 8. When a PTE for a required address is not present in the uTLB 22, the shader core 4 issues a PTE request (cache refill request) to the MMU. If the main TLB 10 contains the requested PTE, that PTE is returned to the shader core 4 which requested it, cached in that core's uTLB 22, and used to translate the address to be accessed in the L1 cache 6. If the main TLB 10 does not store the required PTE, the MMU 8 initiates a page table walk operation to the memory system 12 to fetch the required PTE. The page table walk operation can be slow as there may be several levels of page table to be traversed to find the required PTE. Once the required PTE is returned from main memory 12 it is cached in the main TLB 10 and also sent to the uTLB 22 of the shader core 4 which requested that entry.

Some systems may support several different virtual address spaces, so that different processes executing on the apparatus 2 may see different views of the memory address space. In this case, the memory system 12 may include more than one set of page tables, each set of page tables corresponding to a different address space. Translation requests from the shader core 4 to the TLB, cache refill requests from the uTLB 22 to the MMU 8, and page table walks from the MMU 8 to memory 12 may each may specify an ASID for which an address translation is required. The PTEs in the uTLB 22 and main TLB 10 may include the ASID to indicate which address space they correspond to. Requests may trigger a hit in the uTLB 22 or main TLB 10 if a PTE is present for the ASID and the address specified in the request. Sometimes, the uTLB 22 or main TLB 10 may include PTEs relating to several different address spaces simultaneously.

The GPU 2 shown in FIG. 1 is just one example. Other systems may also have a central MMU 8 and a number of satellite uTLBs 22 at each point at which address translation is required. In this type of system, asynchronous networks are increasingly being used. However, the data coherency between the different uTLBs 22 can pose a problem when the core network 20 does not support multicast or broadcast addressing modes, especially for invalidation of the uTLBs 22 when the page tables in memory 12 are reconfigured. Adding multicast or broadcast addressing modes to a unicast network can increase complexity and verification effort to avoid functional bugs and deadlock situations, and make it harder for the interconnect network to scale to larger numbers of uTLBs 22.

Figure 2:
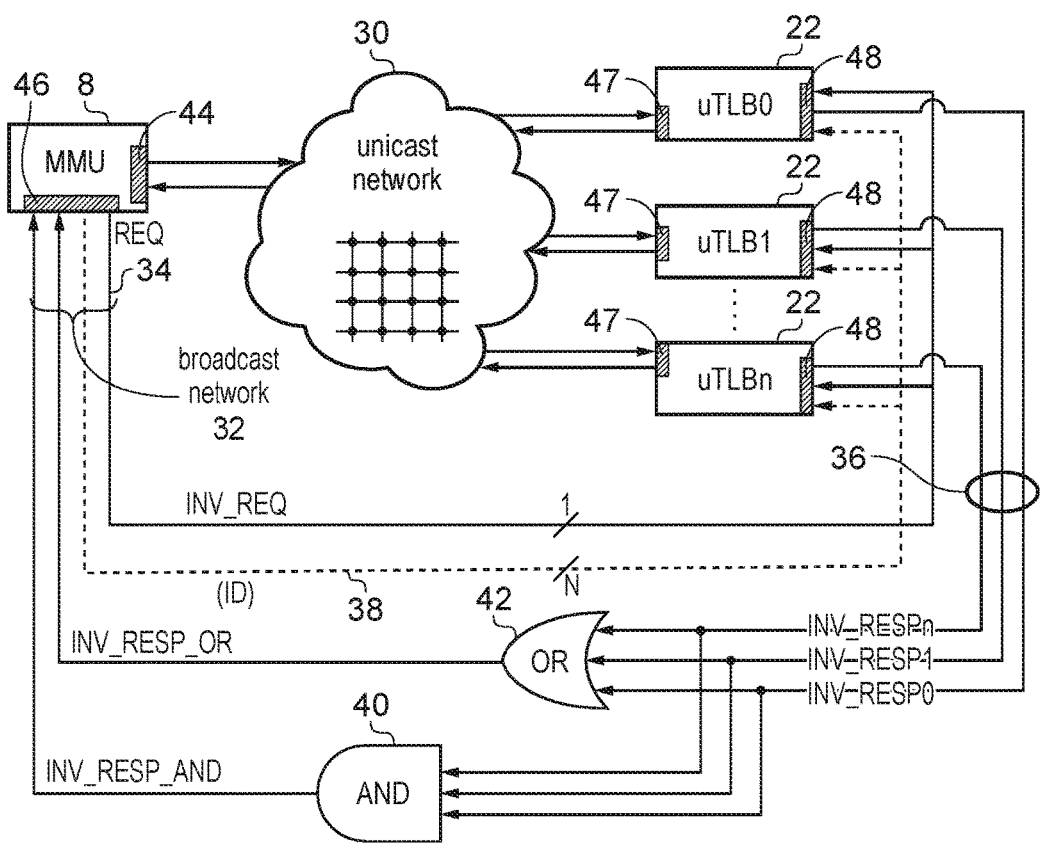
FIG. 2 schematically illustrates an example of a unicast network and a multicast network for communication between the controller and the caches.

To address this, as shown in FIG. 2 the interconnect 20 may comprise a first network 30 which is used for a unicast communications between the MMU 8 and each uTLB 22, and a second network 32 which is used for multicast or broadcast communications between the MMU 8 and multiple uTLBs 22 simultaneously. Hence, the MMU 8 has a first interface 44 for transmitting and receiving signals over the first network 30 and a second interface 46 for transmitting and receiving signals over the second network 32. Similarly, each uTLB 22 has a first interface 47 for transmitting and receiving signals over the first network 30 and a second interface 48 for transmitting and receiving signals over the second network 32. For the remainder of this application the second network 32 is referred to as a broadcast network which routes signals to each of the uTLBs 22, but it will be appreciated that in other examples the network may support multicasting to a specified subset of the uTLBs 22.

The first network (unicast network) 30 may comprise a switch network including a number of switch devices with each switch device selecting which of several signal paths should be used to transmit a received signal. The switch network may allow signals to be exchanged by the controller and any one uTLB 22 via more than one route. Hence, if one route between the MMU 8 and a target uTLB 22 is currently blocked, another route may still be available. For example an AXI switch network using the AXI communication protocol provided by ARM® Limited of Cambridge, UK, may be used. The unicast network 30 may be used for any communication to be routed between the MMU 8 and one particular uTLB 22 (e.g. PTE requests from a specific uTLB 22 to the MMU 8, and PTE responses from the MMU 8 to a specific uTLB).

However, the unicast network 30 does not support multicast or broadcast addressing. As shown in FIG. 1, sometimes the CPU driver 18 or other software process controlling the page tables in the memory system 12 may issue a signal indicating that the page tables have been updated. For example this may happen following a change of context within the CPU or other processing unit which executes the driver 18. The uTLBs 22 may now contain out of date translation data, and so the MMU may issue signals to trigger invalidation of each of the uTLBs 22. Some examples may invalidate all the data in each uTLB 22, while other examples may invalidate at a finer granularity, e.g. by specifying particular address space IDs, context IDs, or blocks of addresses for which PTEs should be invalidated in the uTLB 22. Also, some types of invalidation may require that the corresponding PTEs also need to be invalidated from the main TLB 10 in the MMU 8, while other types may not require invalidation in the main TLB 10.

For invalidations, a separate broadcast network 32 is provided. The broadcast network can be implemented as a variable sized channel depending on the level of cache invalidation that is to be supported. As shown in FIG. 2 the broadcast network may include a request channel 34 over which the MMU 8 may issue an invalidation request which is transmitted to each of the micro TLBs 22. Also the broadcast network 32 includes a response channel 36 which includes signal lines from each of the micro TLBs 22 providing a response to the invalidation request. Optionally, the second network 32 may also include an identification channel 38 which the MMU 8 can use to provide additional information to each uTLB 22. For example, this identification information may identify which entries are to be invalidated in response to the invalidation request, e.g. specifying a particular address space ID, context ID, or block of addresses to be invalidated. However, the identification channel is not essential and in implementations omitting the identification channel then the uTLBs 22 can simply invalidate all their data when the invalidation request is received.

The second network may include logic for combining the individual invalidation responses received from each uTLB 22. In this example the logic includes an AND gate 40 for combining each of the responses from the uTLBs 22 using a logical AND operation and an OR gate 42 for combining the responses using a logical OR operation. The output of the AND gate can indicate whether the uTLB responses are all logical 1, and the OR gate 42 output indicates whether the uTLB responses are all logical 0. For example, in this embodiment signals could be considered to be asserted when at logical 1 and deasserted when at logical 0, but other embodiments could use the opposite mapping. The combined outputs of the AND and OR gates 40, 42 can be useful for the MMU 8 to determine when it is safe to clear the invalidation request on the request channel 34 and to determine when the entire invalidation procedure has completed. This will be described in more detail later. While FIG. 2 shows the logic gates 40, 42 as part of the second network 32, in other examples this logic could be included in the MMU 8 itself and the second network may simply comprise a set of response wires which route each uTLB's response back to the MMU.

With this approach, the broadcast network 32 used for invalidations is easily scalable to encompass different numbers of uTLBs 22. For each additional uTLB 22, one extra line on the response channel 36 and an extra connection between the additional uTLB 22 and the request channel 34 are required, and otherwise the network is the same. In contrast, if the validations were handled using a number of unicast messages in the switch network 30, the amount of extra development and verification work required to ensure safe functioning of the network may rise exponentially with the number of devices.

Figure 3:
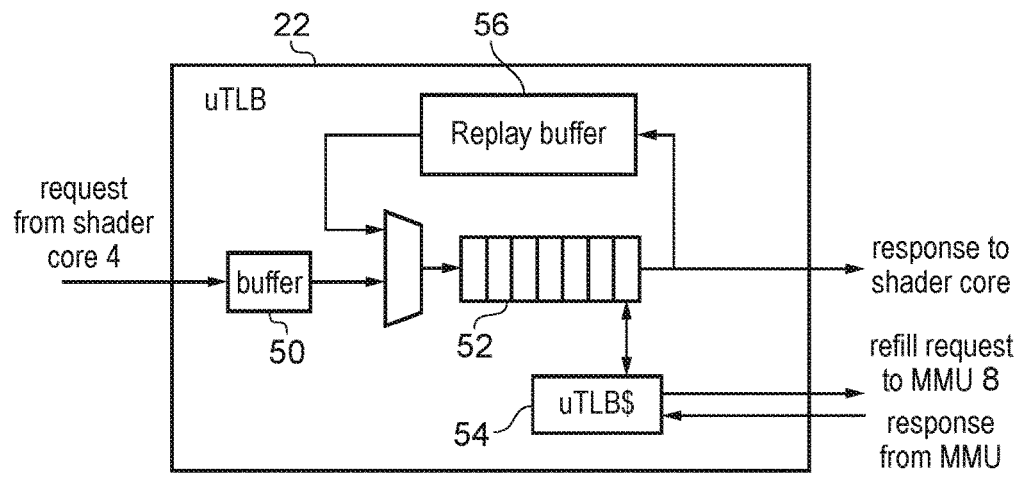
FIG. 3 shows an example of handling data access requests for one of the caches.

FIG. 3 shows an example of circuitry within the uTLB 22 for handling requests for address translations. Each of the uTLBs 22 may have a similar configuration. When the shader core 4 requires some data from the L1 cache 6, it issues an access request specifying an address. The address is issued to the uTLB 22 and placed in a temporary buffer 50 and then queued in a request queue 52 to await servicing by the uTLB's cache 54. For example the request queue 52 may function as a circular buffer into which outstanding requests are stored. A producer pointer may point to the location within the buffer at which the next request should be stored when it is received and a consumer pointer may point to the location of the next request to be processed. Each time another request is added the producer pointer may be incremented and similarly each time a request is processed the consumer pointer may be incremented. When either pointer reaches the end of the buffer, then at the following increment it jumps back to the start of the buffer. In this way, the queue 52 may function as a first-in-first-out (FIFO) buffer. It will be appreciate that other forms of buffer could also be used as the queue 52.

The uTLB's cache 54 selects the next request to be processed from the queue 52 (e.g. using the consumer pointer), and checks whether the address specified by the request has a corresponding entry in the cache 54. If so, then the corresponding page table entry is used to translate the virtual address specified by the request into a physical address, and to determine whether the access to that address is allowed. A response is then provided to the shader core 4 specifying the translated physical address, and the shader core 4 can then use the physical address to access the required data in the L1 cache 6.

On the other hand, if the uTLB's cache 54 does not include a page table entry corresponding to the virtual address specified in the request, then a cache refill request specifying the virtual address is sent to the MMU 8 via the unicast network 30, to request that the MMU 8 returns a PTE corresponding to that address. Also, an entry is allocated in the cache 54 for the PTE which will later be received from the MMU 8, and the access request which triggered the cache refill request is placed in a replay buffer 56 while awaiting the response from the MMU. By providing a separate replay buffer 56 this frees a slot in the request queue 52 that can be used for another request, so that requests which miss in the cache 54 do not block other requests from processing while they wait for a PTE to be fetched from the MMU 8. When a cache refill response providing the requested PTE is received from the MMU, the PTE is placed in the previously allocated entry of the cache 54. Requests in the replay buffer 56 are retried later by inputting them to the request queue 52 again, by which time the required PTE may have been received from the MMU 8 (and if not, the request is returned to the replay buffer 56 once more).

While the example above describes translation direct from a virtual address to a physical address, in other examples there may be two or more stages of address translation, for example a first stage translation from a virtual address to an intermediate address, and a second stage translation from the intermediate address to a physical address. This approach can be useful for supporting virtualisation so that a first program (e.g. a virtual machine or guest operating system) can control the page tables associated with the first stage translation and a second program (e.g. a hypervisor) can control the page tables associated with the second stage translation. In this way, as far as the first program is aware, the intermediate address is a physical address used to access the system memory. However, the hypervisor can control which physical addresses these intermediate addresses are mapped to control real accesses to the physical system memory. In a system having two or more address translation stages, the uTLB 22 may correspond to any one of these stages and there may be several such uTLBs corresponding to different stages of the address translation.

Figure 4:
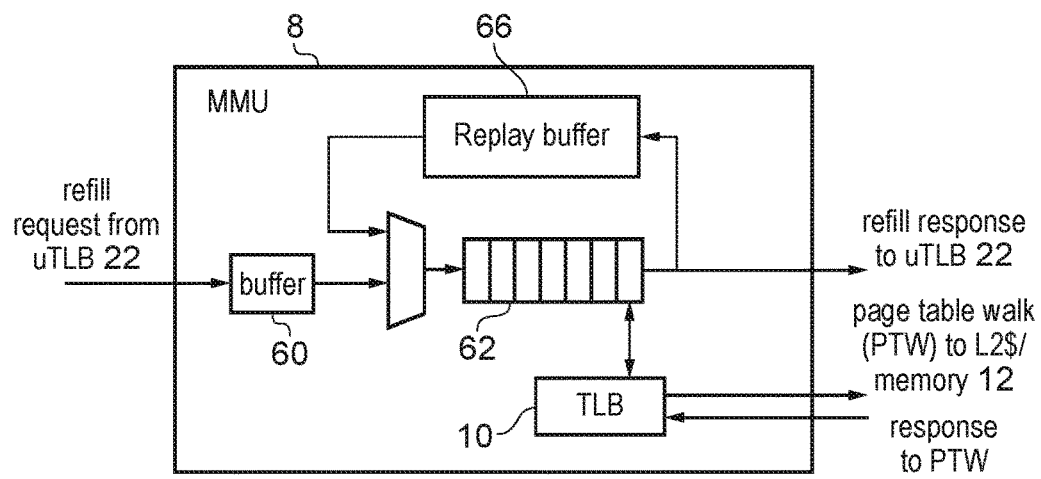
FIG. 4 shows an example of handling cache refill requests at the controller.

FIG. 4 shows how the MMU handles refill requests received from the uTLBs 22. As shown in FIG. 4 the MMU has a similar mechanism to the uTLB including a temporary buffer 60, a request queue 62 for queueing refill requests received from any of the uTLBs 22 and a replay buffer 66. When a request from the queue 62 is selected for processing, the main TLB 10 checks whether it includes a PTE corresponding to the address specified in the refill request, and if so, a cache refill response comprising that PTE is transmitted over the unicast network 30 to the uTLB which sent the corresponding cache refill request. On the other hand, if the refill request misses in the main TLB 10 then a page table walk is initiated to the memory system 12, an entry for the corresponding PTE is allocated in the main TLB 10, and the refill request is placed in a replay buffer 66 to retry later. When a PTE is returned from memory 12 following the page table walk, it is stored in the allocated entry in the main TLB 10. On a subsequent attempt to process the refill request placed in the replay buffer 66, the request will now hit in the TLB 10 and a cache refill response with the required PTE is returned to the uTLB 22 which requested the PTE.

As discussed above, the MMU 8 may receive a signal from another device (e.g. from software such as a CPU driver 18 executing on a CPU) indicating that the page tables in memory 12 have been updated, and may then trigger a cache invalidation within each of the uTLBs 22. As shown in FIGS. 3 and 4, at this time there are a number of places within the system where requests and responses to requests may be pending. For example, access requests could be pending in the request queue 52 or the replay buffer 56 of the uTLB, cache refill requests may be in transit across the unicast network 30 or may be pending within the queue 62 or replay buffer 66 of the MMU, and page table walks (also known as TLB linefill requests) may be pending within the memory system 12. To prevent out of date PTEs being used for address translations following the cache invalidation and prevent loss of data before or after an invalidation, a protocol may be provided as discussed below.

When the MMU 8 receives an invalidation request from the CPU driver 18:

1. The MMU may continue to respond to all cache refill requests that are already inside the MMU or travelling through the network 30 (and that could potentially be received after the invalidation has completed). This includes old requests that were pending at the time of receiving the invalidation request.

While the PTE provided in response to such requests may be old, as discussed below the uTLB will discard the PTE provided in such responses, to prevent use of out of date data. Since the MMU 8 responds to all pending requests regardless, requests are not lost within the system and the uTLB 22 is not waiting indefinitely for a response to a given request, which can help to improve performance at the uTLB 22.

2. In response to the invalidation request, the MMU asserts the INV_REQ output 34 and marks cache refill requests in the queue 62 or replay buffer 66 which are pending at this point as "discarded" (e.g. by setting a flag associated with the request). When a response to a page table walk is received for a request marked as "discarded", the PTE provided by the memory system 12 is discarded without storing it to the main TLB, as it could have been read from the memory before the update to the page tables.

Having asserted the INV_REQ output 34, the MMU 8 can continue to service cache refill requests. Requests within the queue 62 which are marked as "discarded" do not trigger page table walks, and instead a response can be generated to the uTLB which can specify any data (e.g. dummy data) as the PTE, since this data will be discarded by the uTLB 22 anyway. Requests within the queue 62 which are not marked as "discarded" are handled in the normal way as discussed for FIG. 4.

3. The MMU waits for all the uTLB response signals INV_RESP 36 to be asserted (e.g. when the output of AND gate 40 is logical 1), meaning all the uTLBs have seen the invalidation, and de-asserts INV_REQ 34.

4. The MMU waits for all the uTLBs to de-assert INV_RESP 36 (e.g. when the output of OR gate 42 is logical 0), meaning they have all finished the invalidation, before a next invalidation request can be processed.

Optionally, the MMU may also discard any further invalidation request from the CPU driver 18, without issuing another invalidation request 34 over the second network 32, if at the point the further invalidation request was detected, not all of the uTLBs 22 have asserted their response signal 36 and the MMU 8 has not yet started to service cache refills.

On the other hand, when the uTLB 22 receives an invalidation request from the MMU 8 (INV_RESP 34 is asserted on the second network 32):

1. The uTLB 22 may invalidate its cache 54 and mark requests in the queue 52 or replay buffer 56 for which cache refill requests are outstanding as to be "discarded" (e.g. by setting a flag associated with these requests). When a response to a "discarded" request is received from the MMU 8, the PTE provided in that response (which may be out of date or dummy data as discussed above) is discarded and not stored to the cache 54.

2. The uTLB 22 also re-issues all the cache refill requests that are waiting for a response (which are either travelling across the network 30 or already received by the MMU 8).

3. The uTLB 22 asserts the invalidation response signal INV_RESP 36 at a given point of the invalidation protocol (e.g. immediately on receiving the invalidation request, or once the cache has been invalidated). The uTLB 22 deasserts the invalidation response signal when the invalidation protocol is complete (e.g. when the responses to all the requests marked as "discarded" have been received).

Figure 5:
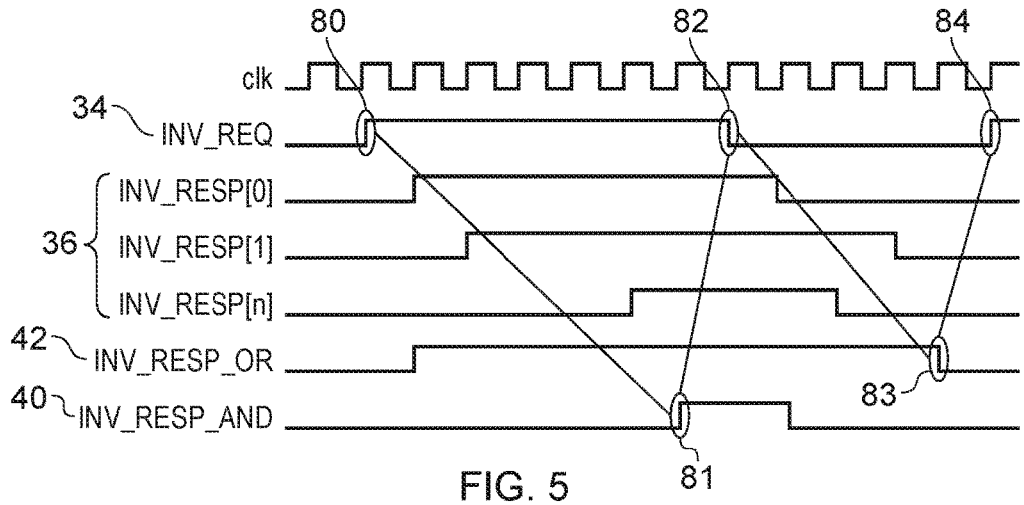
FIG. 5 is a signal diagram showing an example of an invalidation handshake protocol between the controller and a number of caches.

FIG. 5 is a timing diagram showing the invalidation signals exchanged by the MMU 8 and the uTLBs 22 over the second network 32. At point 80, the MMU 8 asserts the invalidation request signal 34, which is broadcast to each of the uTLBs 22. When a uTLB 22 detects the invalidation request being asserted, it asserts its invalidation response signal 36. The invalidation responses are ORed by OR gate 42 and ANDed by AND gate 40. When the MMU 8 detects that the AND output 40 is asserted (i.e. all of the uTLBs 22 have seen the invalidation request) then at point 82 the MMU 8 deasserts the invalidation request 34. When a uTLB 22 has finished its invalidation protocol (e.g. responses have been detected for all requests marked as "discarded"), the uTLB 22 deasserts its invalidation response signal. When each of the uTLBs 22 has deasserted its response signal, the OR output 42 drops low (point 83 of FIG. 5), and at this point the MMU 8 is free to issue further invalidations at point 84 if necessary. The signals shown in FIG. 5 are asynchronous which simplifies timing closure on the second network 32. This provides a relatively simple handshake for synchronizing the invalidation cycle.

Figure 6:
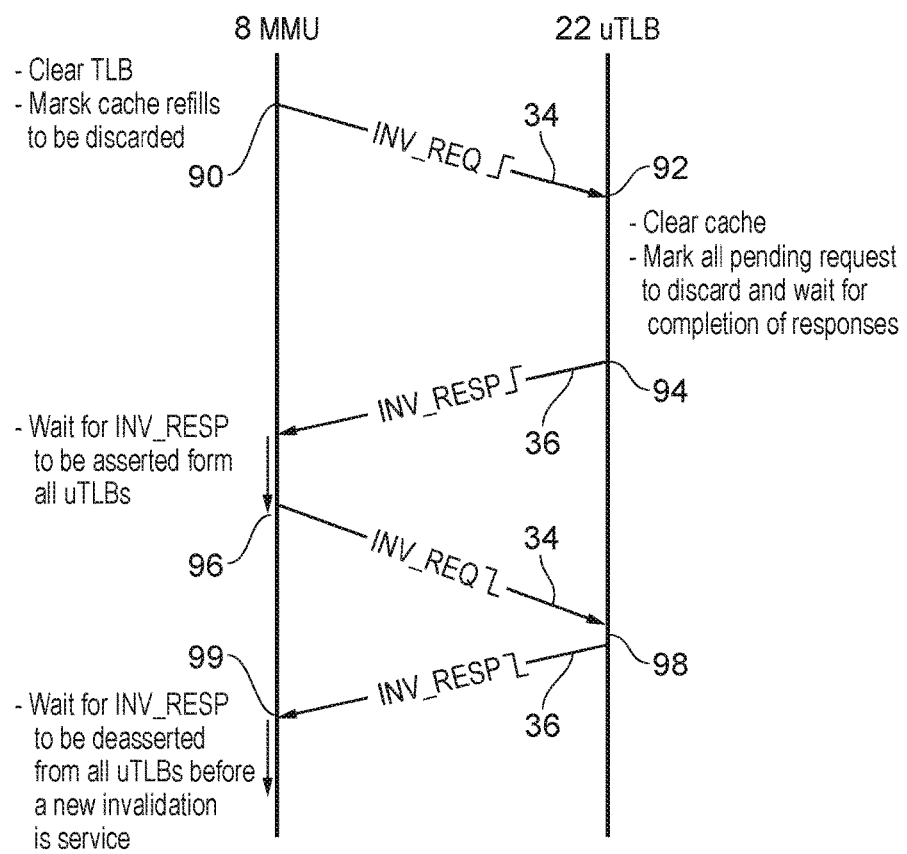
FIG. 6 shows another example of the invalidation handshake protocol.

FIG. 6 shows an example of the invalidation protocol according to the rules described above. FIG. 6 shows the handshake between the MMU 8 and a single uTLB 22, but the other uTLBs 22 would operate in a similar way. At point 90 the MMU 8 receives the invalidation request from the CPU driver 18. In response, the MMU 8 clears the main TLB 10 and marks any cache refills that are pending as to be discarded. Meanwhile the MMU 8 continues providing responses to cache refills from the uTLBs 22. The MMU 8 asserts the invalidation request 34. At point 92, on receiving the invalidation request the uTLB 22 clears its internal cache 54 and marks any pending requests in the queue 52 or replay buffer 56 as to be discarded and then waits for responses to these requests. The TLB also reissues the refill requests corresponding to requests marked as discarded. The uTLB asserts the invalidation response signal 36 at point 94 to signal that it has seen the invalidation request. At point 96, the MMU 8 detects that all uTLBs have asserted the response signal 36, and deasserts the invalidation request signal 34. At point 98, when the uTLB 22 completes its invalidation procedure, it deasserts the invalidation response signal 36. At point 99, when all of the uTLBs have deasserted their response signal 36, the MMU 8 is now free to service another invalidation event.

While FIG. 6 shows an example where the MMU 8 invalidates the main TLB 10 in addition to the invalidation of the uTLBs 22, for other types of invalidation it may not be necessary to clear the main TLB 10. Also, this protocol shows an example where the entire uTLB 22 is cleared entirely of PTEs, but in other examples some identifying information (e.g. an address space ID, context ID or identifying a block of addresses) may be provided with the invalidation request 34 along the identification channel 38, and the uTLB may only invalidate entries corresponding to the identifying information while other entries remain valid.

Figure 7:
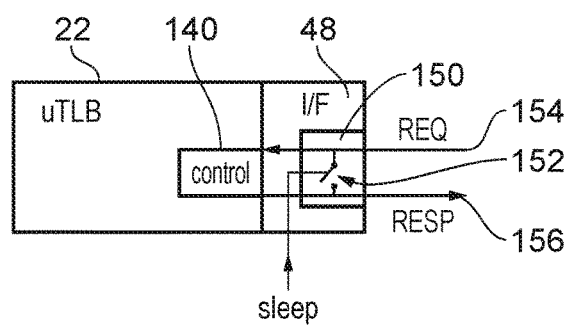
FIG. 7 shows an example of response generating circuitry for generating a response to an invalidation request when a cache is in a power saving state.

FIG. 7 shows an example where a uTLB 22 supports a sleep mode in which the uTLB 22 is placed in a power saving state. For example the sleep mode may be selected if the corresponding shader core 4 is idle. For instance, if there are N shader cores 4 but fewer than N threads to process at a given time, then the unused shader cores 4 may be placed in the power saving state. The uTLB may have some control circuitry 140 which controls the handshake protocol for invalidations and asserts/deasserts the invalidation response depending on the progress of the invalidation procedure as discussed above. However, this control circuitry 140 may be powered down during the power saving mode, so would not be able to provide the invalidation response signal 36. However, the MMU 8 may be waiting for invalidation responses from each uTLB 22 before proceeding with other operations, and so it is not desirable for a uTLB 22 to delay these other operations when it cannot generate its invalidation response. One option may be to bring the shader core 4 out of the sleep mode when an invalidation request is received, but this would increase power consumption and may be unnecessary as the uTLB's cache 54 may already have been invalidated before entering the power saving state.

To address these issues, the second interface 48 within the uTLB 22 may include response generating circuitry 150 which automatically generates the invalidation response in response to an invalidation request even while the uTLB 22 is in the power saving state. For example, as shown in FIG. 7 the response generating circuitry may include a switch 152 which selectively couples together the signal lines 154, 156 on which the invalidation request and invalidation response are transmitted. When not in the power saving state, the switch may be open so that the request is routed to the control circuitry 140 and the control circuitry 140 controls the state of the response signal. However during the power saving state the switch 152 may be closed to couple the signal lines 154, 156 together so that any assertion or deassertion of the request signal 34 causes a corresponding assertion or deassertion of the response signal 36. Effectively, the request signal is looped back to form the response signal. This ensures that the MMU 8 is not waiting unnecessarily for a response from a powered down uTLB 22, and that it is not necessary to wake up the uTLB 22 from the power saving state.

Figure 8:
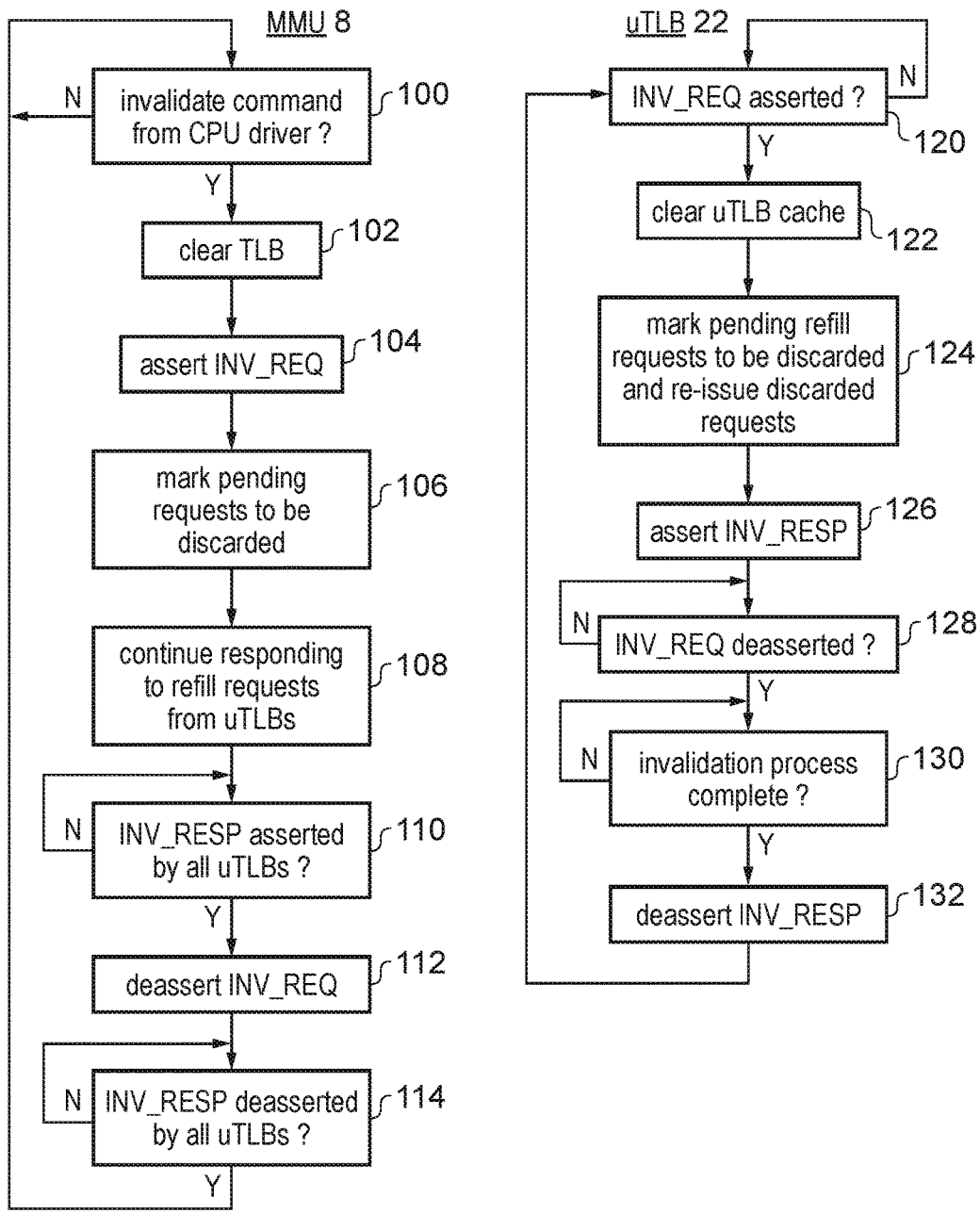
FIG. 8 illustrates a method of cache invalidation under control of the controller.

FIG. 8 is a flow diagram showing the invalidation protocol at the MMU 8 and a uTLB 22. At step 100 the MMU 8 detects whether there has been an invalidation command from the CPU driver 18 or other software triggering invalidations. If so, then at step 102 the MMU invalidates the main TLB 10 and at step 104 the MMU 8 asserts the invalidation request 34 on the second network 32. At step 106 the MMU 8 marks pending requests to be discarded, for example by setting a control flag for any pending request in the queue 62 or the replay buffer 66. Hence when page table walk responses are received from memory 12, the returned PTE will not be placed in the main TLB 10. At step 108 the MMU 8 continues to respond to refill requests from any uTLBs 22. This is the case even if those refill requests were issued before the invalidation and even if the responses provide out of date data or dummy data, not the data following the page table update. As described below the uTLB 22 will in any case discard any data received in response to such requests.

At step 110 the MMU 8 determines whether the invalidation response 36 has been asserted by all uTLBs 22. Once all the responses have been asserted, then at step 112 the MMU 8 deasserts the invalidation request 36. This ensures that the invalidation request remains active until all the uTLBs have acknowledged it. At step 114, the MMU 8 determines whether the invalidation response has been deasserted by all the uTLBs. When all the responses have been deasserted then the method returns to step 100 where further invalidation commands may be processed.

The right hand part of FIG. 8 shows processing performed by the uTLB 22. It will be appreciated that each uTLB may perform similar steps. At step 120 the uTLB determines whether the invalidation request signal 36 has been asserted by the MMU. If so, then the method proceeds to step 122 where the uTLB 22 invalidates its internal cache 54. At step 124, pending requests in the queue 52 or replay buffer 56 are marked as to be discarded and cache refill requests are reissued to the MMU 8 for any discarded requests, so that this will trigger fresh page table walks to fetch updated data if necessary. When any responses are received for the refill requests marked as to be discarded, the PTE included in such responses by the MMU 8 is discarded without updating the cache 54. At step 126 the uTLB 22 asserts its invalidation response 36. At step 128 it is determined whether the MMU 8 has deasserted its invalidation request 34. If so, then it is determined at step 130 whether the invalidation process is complete (e.g. this may be the case when responses have been received for all the requests marked as to be discarded). When the invalidation process is complete, then at step 132 the uTLB deasserts the invalidation response signal 36 to indicate to the MMU 8 that it is ready to handle another invalidation if necessary.

It will be appreciated that the steps shown in FIG. 8 may be performed in a different order. For example steps 102 to 108 could be reordered or performed at least in part in parallel by the MMU 8. Similarly steps 122 to 126 could be reordered or performed in parallel by the uTLB 22.

While the above example describes a system comprising a number of uTLBS 22 managed by a central MMU 8, a similar technique can be applied to any system in which a central controller controls a number of distributed caches. For example, in any data processing system comprising a number of distributed caches and a central controller for managing the caches, a unicast network and multicast network could be provided between the controller and caches dedicated to unicast and multicast communications respectively.

Figure 9:
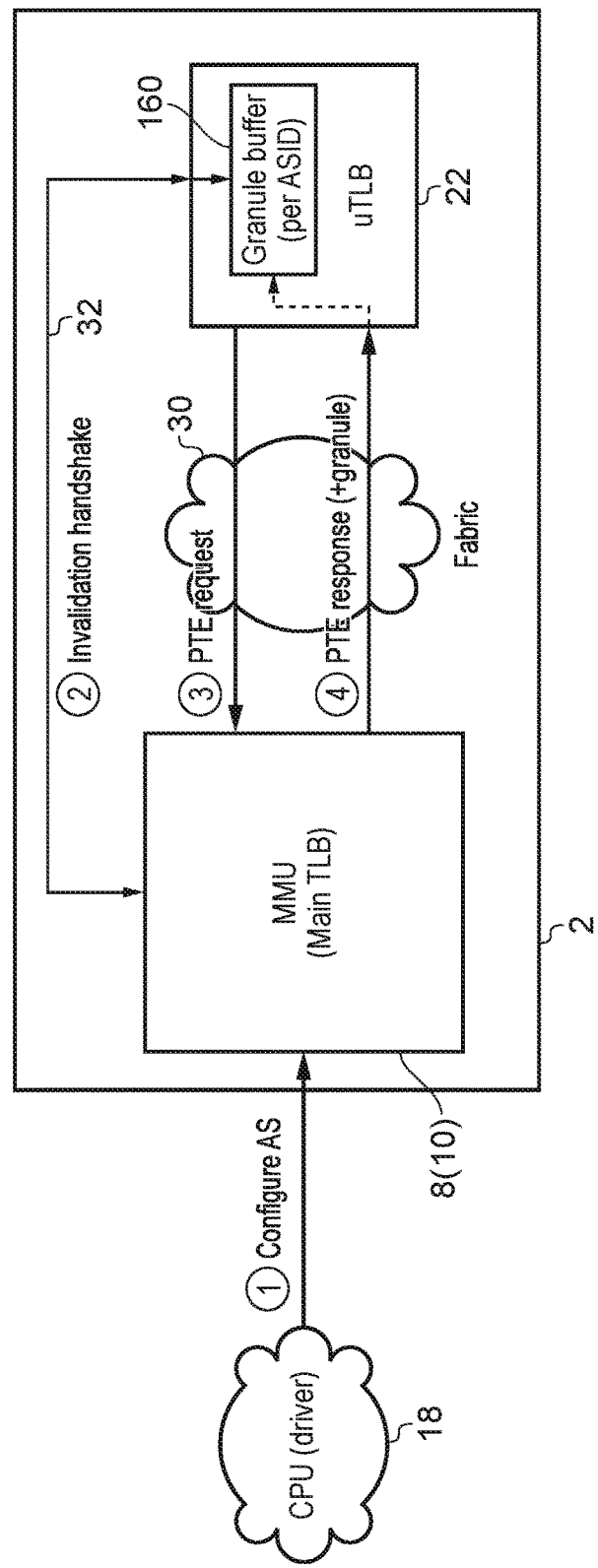
FIG. 9 illustrates an example of a system having a cache with entries corresponding to blocks of addresses of one of a plurality of different sizes.

FIG. 9 schematically illustrates a portion of the apparatus 2 shown in FIG. 1. FIG. 9 shows a uTLB 22 of a shader core 4, which is connected to the main TLB 10 of the MMU 8 via the interconnect. It will be appreciated that the other parts of FIG. 1 may still be provided, but for conciseness they are not shown in FIG. 9. As discussed above, PTE requests and responses are transmitted over a first network 30 and invalidation requests and responses are transmitted over a second network 32 separate from the first network 30.

The uTLB 22 includes a granule buffer 160 which stores a granule size which is set by the MMU 8 under control of the CPU (driver) or software 18. The granule size is the smallest block of addresses which can be represented by a single PTE.

The apparatus supports multiple granule sizes. For example, in the examples discussed below two granule sizes of 4 KB and 64 KB are discussed, and the granule buffer 160 indicates which is currently selected. When reconfiguring an address space, the CPU driver 18 may indicate to the main TLB 10 which granule size is selected, and the main TLB 10 may indicate this to the uTLB 22. As discussed below, the uTLB 22 can refer to the granule size stored in the buffer 160 when allocating a PTE to the uTLB 22, and store within the entry an entry size indicator indicating the size specified by the granule size in the buffer 160. When an access request is received, the uTLB 22 can use the entry size indicator of each entry to determine which portion of the tag in each entry to compare against the target address, when identifying whether there is a PTE in the uTLB 22 for the target address.

In some systems, each PTE may represent a block of addresses called a page which corresponds to a certain integer multiple of the granule size. For instance, pages may comprise blocks of addresses corresponding to 1, 2, 4 or 8 granules. In this case, the entry size indicator in an entry may specify the page size in terms of a multiple of the granule size indicated in the granule buffer 160.

Other embodiments may not support pages corresponding to multiples of the granule size, and instead each PTE may simply correspond to a block of addresses of the granule size indicated in the granule buffer 160 (i.e. the page size may be the same as the granule size in this case and the entry size indicator of each entry may be the same as the corresponding granule size indicator in the granule buffer 160).

The apparatus may also support multiple address spaces, and different address spaces may be configured with different granule sizes. Hence, the granule buffer 160 may store multiple indicators of the granule size, one for each address space, and on allocating an entry for a given address space, the uTLB 22 may refer to the granule size indicator for the corresponding address space in order to determine the entry size indicator for that entry.

However, following a reset event the granule buffer 160 may no longer store the correct selected granule size. One example of a reset event may be when the CPU driver 18 reconfigures an address space (e.g. rewrites the page tables in main memory 12). At this point, the CPU driver 18 may signal to the MMU 8 that the uTLBs 22 should be invalidated, and the invalidation may be handled as discussed above. Following the reconfiguration, the address space may have a different granule size, and so on invalidation the granule size indicator in the granule buffer 160 may also be reset. Other examples of reset events may be a power on or wake up event, following which the granule size may be lost, or a context switch, or any other event which could lead to loss or change of the granule size indications.

Hence, following a reset event, the granule size may be unknown. One option may be for the MMU 8 to broadcast the new granule size to all the uTLBs 22 before the uTLBs 22 begin to service cache access requests or allocate new entries to the uTLB 22. However, as discussed above, adding broadcast functionality to the network in the interconnect 20 can be undesirable. In practice, this overhead may not be justified since following a reset event typically the uTLB 22 will be invalid and need to fetch PTEs from the main TLB 10 before being able to service further address translations. Hence, the MMU 8 may provide an indication of the granule size along with the first PTE response following a reset event, as shown in FIG. 9. In some cases, the granule size may be provided with every PTE response, and the uTLB 22 may update the granule size indication in the granule buffer 160 if the granule size indicated in the most recent PTE response is different to the size indicated in the granule buffer 160 for the corresponding address space.

However, there may be some delay between the uTLB 22 starting to receive requests for address translations following the reset event, and the MMU 8 providing the first PTE response. For example, if the main TLB 10 was also invalidated, it is likely that the PTE requests following the reset event will trigger page table walks, which can be relatively slow to process. Hence, it may be some time before the granule size becomes known to the uTLB 22. In the meantime, there may be a number of address requests from the shader core 4 to process, and the granule size may be required in order to determine what range of addresses maps to each PTE in the uTLB 22, and hence whether there is a hit or miss.

Therefore, the granule size for an address space may be assumed to be a certain default size following a reset event affecting that address space, until the actual granule size for the address space becomes known when the first PTE response for that address space is received from the MMU 8. In response to a reset event, the granule buffer 160 may be reset to a value corresponding to the default size. The uTLB 22 may then continue processing address requests based on the default size, including allocating new entries in the uTLB 22 and triggering PTE requests to the MMU, before the actual size is known. This reduces the performance overhead associated with the invalidation or other reset event since the relatively slow PTE requests to the MMU can be triggered without waiting for an actual granule size to be indicated.

One approach may be to select the smallest of the possible granule sizes as the default size. FIGS. 10A to 10D show the result of assuming a smaller granule size when the actual granule size is unknown, for example, following a reset event. In this example, the smallest granule size is 4 KB, whilst the largest granule size is 64 KB. It will be appreciated that other examples may support different sizes or more than two sizes.

Figure 10A:
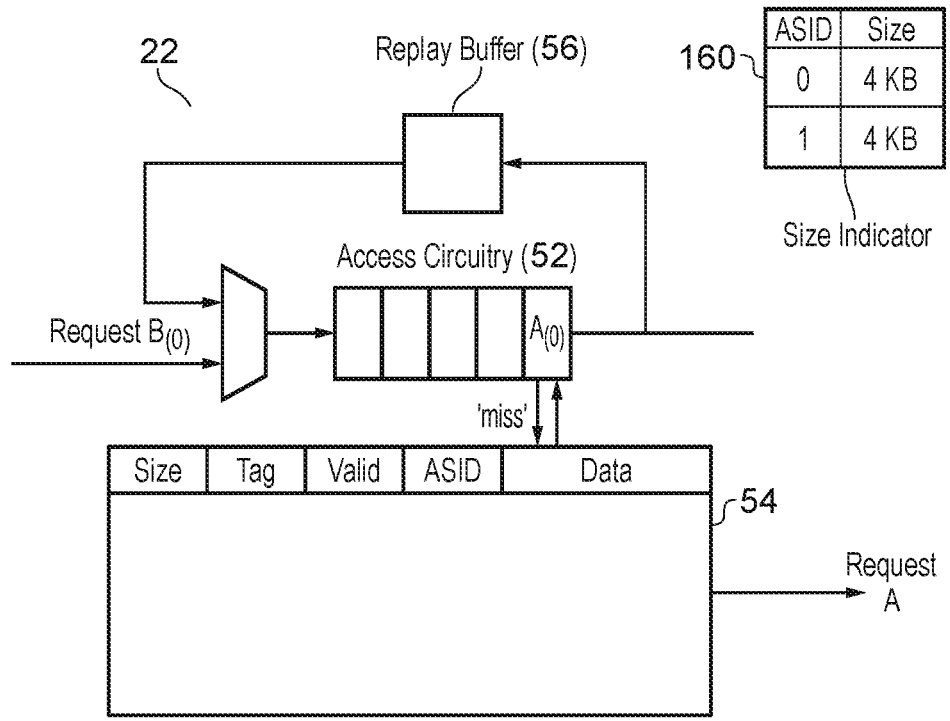
FIG. 10A to 10D show an example of cache access circuitry allocating entries in a cache assuming a small block size.
Figure 10B:
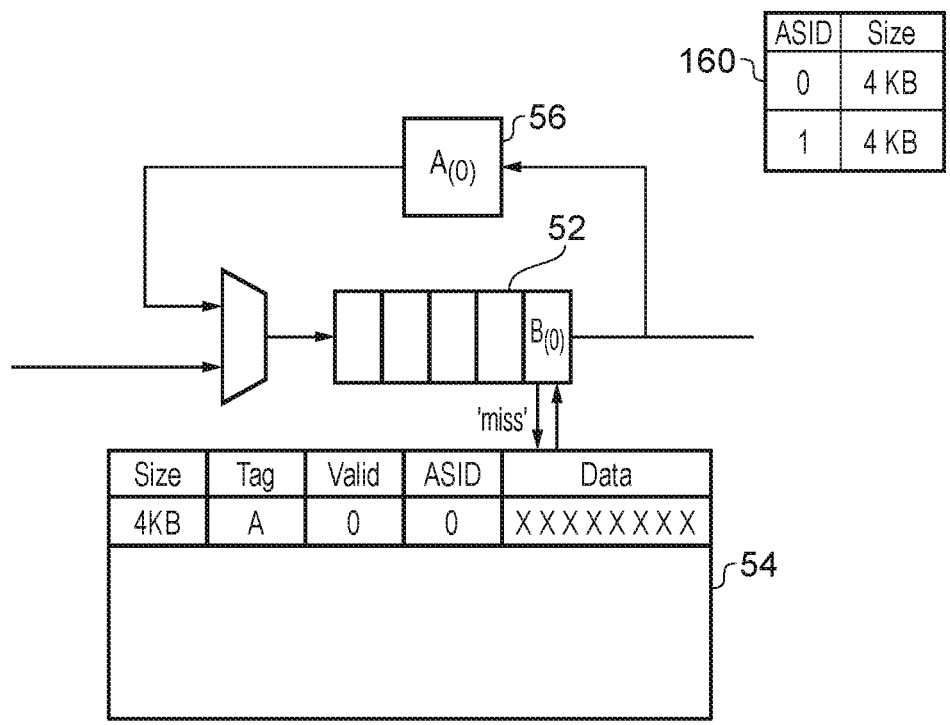
Figure 10C:
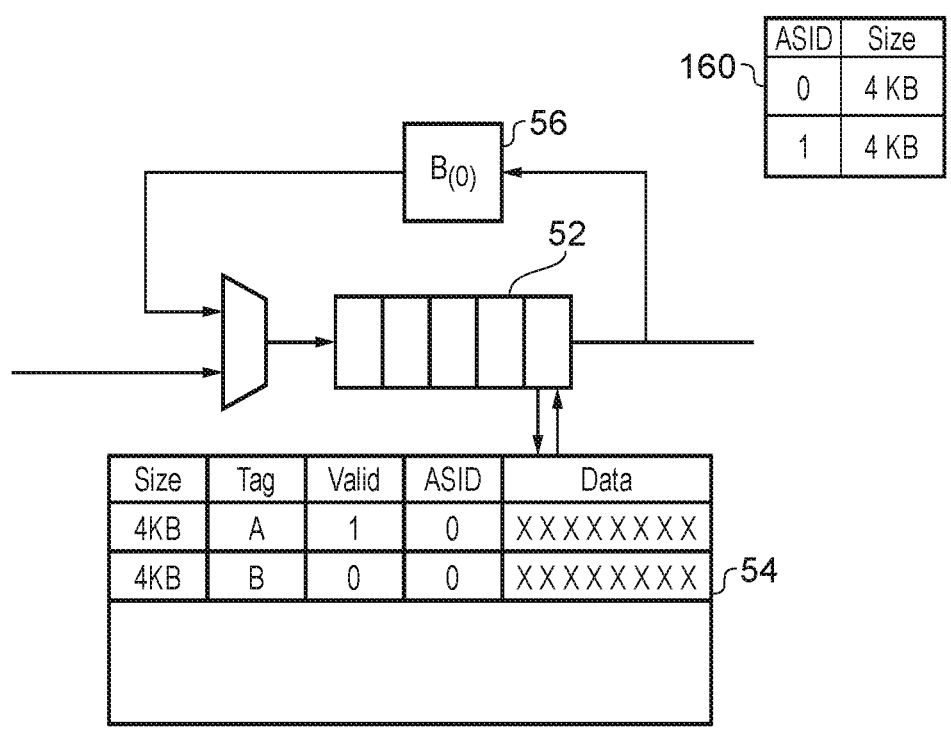
Figure 10D:
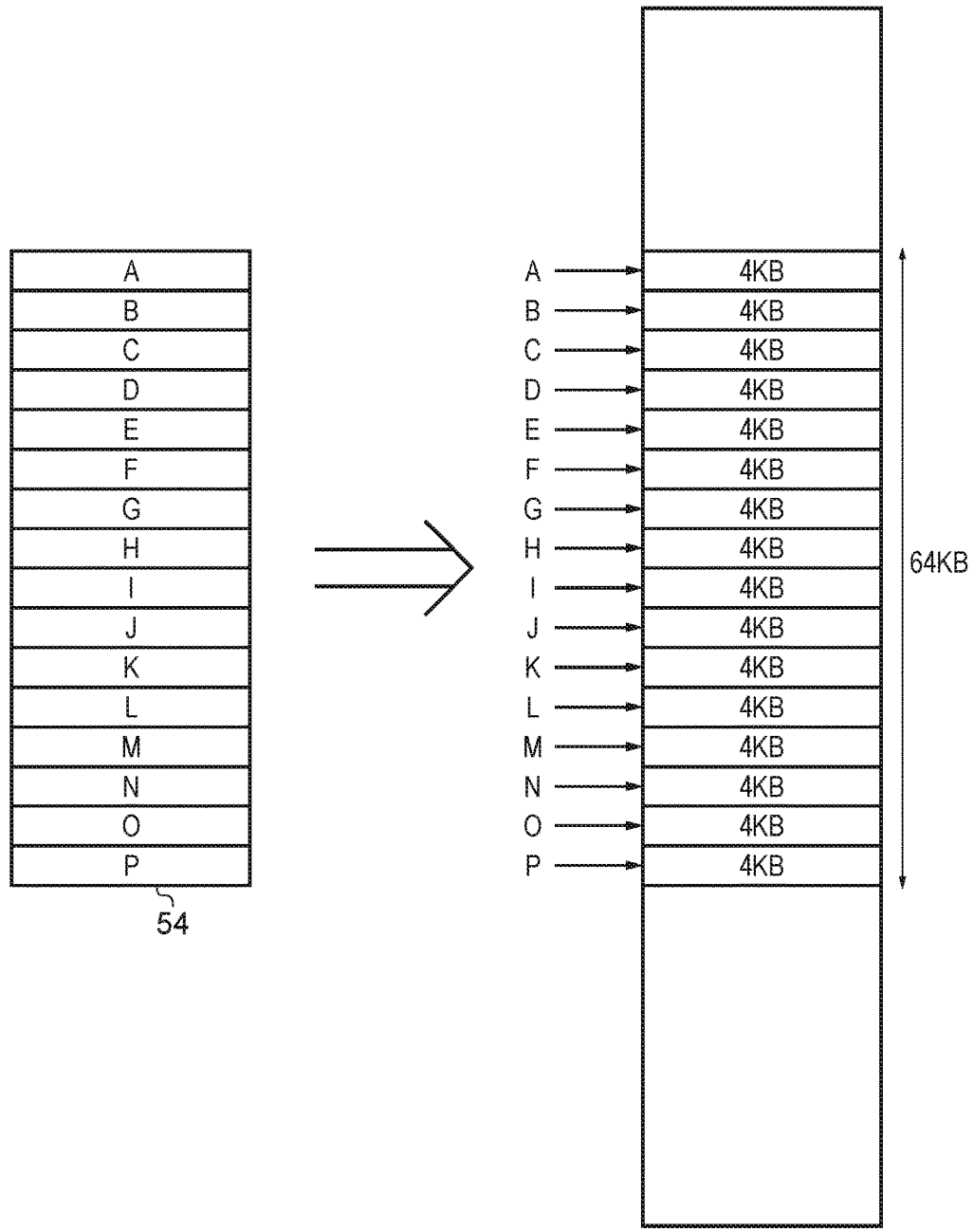

As shown in FIG. 10A, the uTLB 22 comprises a cache 54, cache access circuitry 52, and a replay buffer 56 as discussed above for FIG. 3, as well as size indicators 160 for each address space. In this example, the current granule size is unknown for all address spaces, but the apparatus 22 assumes the smallest granule size of 4KB. The cache access circuitry 52 may be in the form of a request pipeline which queues requests received from a shader core 4 or other device. A¬(0) represents a request for data at address A of address space 0. Once it is selected for servicing by the cache access circuitry 52 in FIG. 10A, the cache access circuitry 52 searches the cache 54 for data with a corresponding tag. In this case the cache 54 is empty and so a 'miss' occurs. Due to the miss the cache 54 initiates a subsequent request to the main TLB 10 for the data (a PTE request). Additionally an entry is reserved in the cache 54 for when the data is returned and request A¬(0) is transferred to the replay buffer 56 as shown in FIG. 10B. The allocated entry in the cache contains a tag from request A¬(0), an associated address space identifier, a size flag determined based on the default size stored in the granule buffer 160, and a valid field set to invalid as no corresponding data is currently stored in the cache line. The replay buffer 56 may take a similar form to the cache access circuitry 52 and comprises a pipeline or queue for pending requests. Whilst a request is in the replay buffer 56 it will be periodically resent to the cache access circuitry 54 until a hit occurs. Meanwhile, request B(0), which is a request for an address B in a different 4 KB block to the 4 KB block comprising address A, but which is within the same 64 KB block as address A, has been selected for servicing. During the tag comparison between A and B, as the size flag associated with A indicates the granule size indicates 4 KB, a larger subset of bits of address B are compared with corresponding bits of the tag of entry A stored in the cache 54 and since these portions are different (since addresses A and B correspond to different 4 KB blocks), another miss occurs. As shown in FIG. 10C, B(0) is then transferred to the replay buffer 56 and another entry is allocated in the cache 54 for address B.

In the worst case scenario, the granule size turns out to be the largest size of 64 KB and the process described above occurs for 16 different requests for addresses which are all different 4 KB portions of the same 64 KB block, causing the cache 54 to allocate an entry for each of these requests, even though had the actual page size been known, they would have shared a single entry. The impact of this is illustrated, for example, in FIG. 10D which shows the cache 54 full of entries for addresses A to P which correspond to different 4 KB portions of the same 64 KB page within the memory. However, as the granule size is actually 64 KB, only a single entry in the cache was necessary for all 16 requests. Since the cache 54 is full, any subsequent requests to other 64 KB blocks will begin to fill the pipeline 52 and replay buffer 56 in the cache access circuitry 52 and cannot be serviced because they cannot have an entry allocated in the cache, and a backlog of unserviced requests may develop, harming performance. Furthermore, there has been a significant amount of unnecessary traffic between the cache 54 and the main TLB 10 in sending 16 PTE requests and 16 PTE responses instead of 1, which wastes power.

The risk of this problem can be reduced by instead assuming a larger default size when the actual granule size is unknown. One example of this applied to the same situation is illustrated through FIGS. 11A to 11H.

As previously described, the uTLB 22 comprises a cache 54, cache access circuitry 52, a replay buffer 56 and a size indicator 160. However, in this example, although there has been a reset event and the granule size is unknown, the apparatus assumes a default size of 64 KB.

Figure 11A:
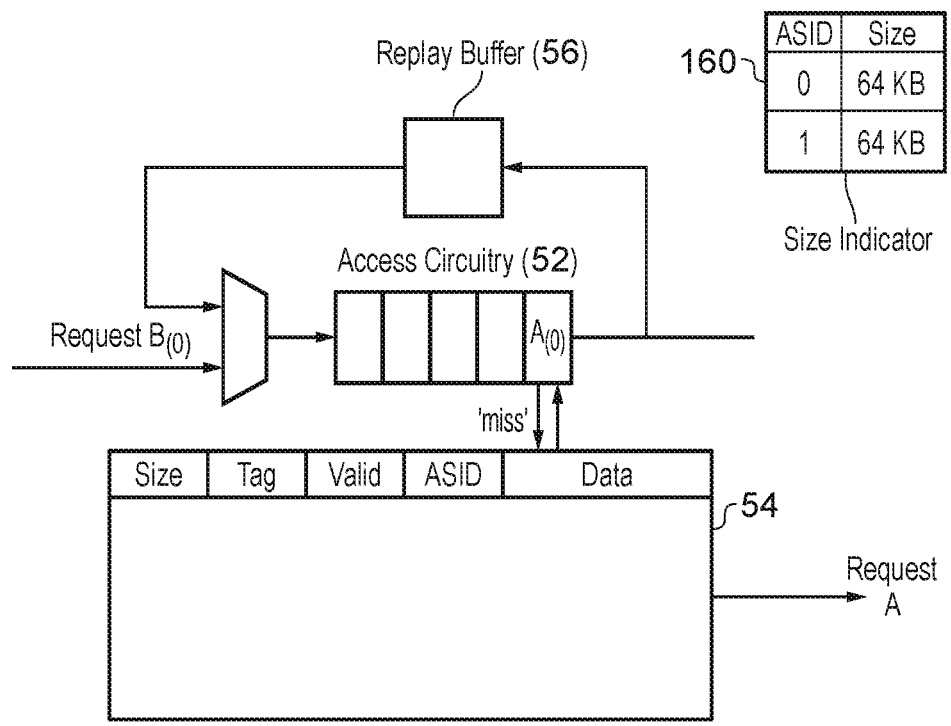
FIG. 11A to 11H show an example of cache access circuitry allocating entries in a cache based on a default block size which is larger than at least one other block size.
Figure 11B:
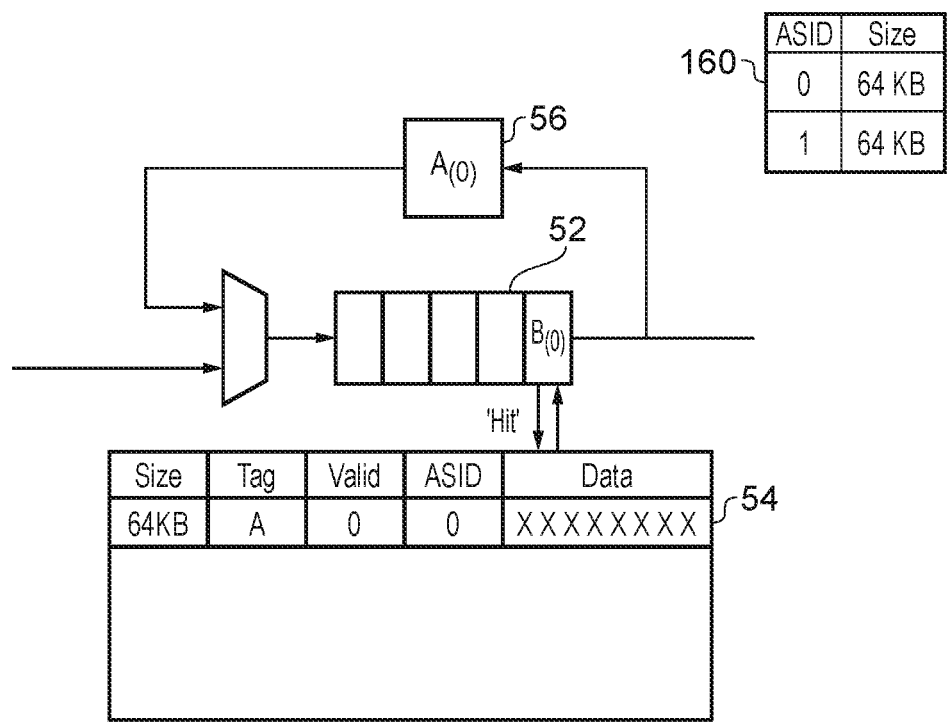

The process shown in FIG. 11A is similar to that of FIG. 10A in that request A¬(0) misses as the cache 54 is empty. In response to the miss the cache 54 initiates a request to the main TLB 10 for the data. A¬(0) is then transferred to the replay buffer 56 and a space is reserved in the cache 54 for the data corresponding to address A as shown in FIG. 11 B¬. Meanwhile B(0)¬ has been selected for servicing by the cache access circuitry 52. As the size flag in entry A indicates a granule size of 64 KB, when the comparison between address B and tag A stored in the cache 54 occurs, more of the less significant bits are omitted from the comparison than in the example of FIG. 10B. This omission may be performed by masking circuitry configured to mask, for each entry, a portion of the tag of that entry in dependence on the value stored in the size flag of that entry. As both addresses A and B correspond to the same 64 KB page, the more significant bits of address B and the tag in entry for address A which are compared match, hence a 'hit' occurs and another allocation is not made. However, as a valid field set to '0' indicates that the data is not available, B(0) is transferred to the replay buffer.

Figure 11C:
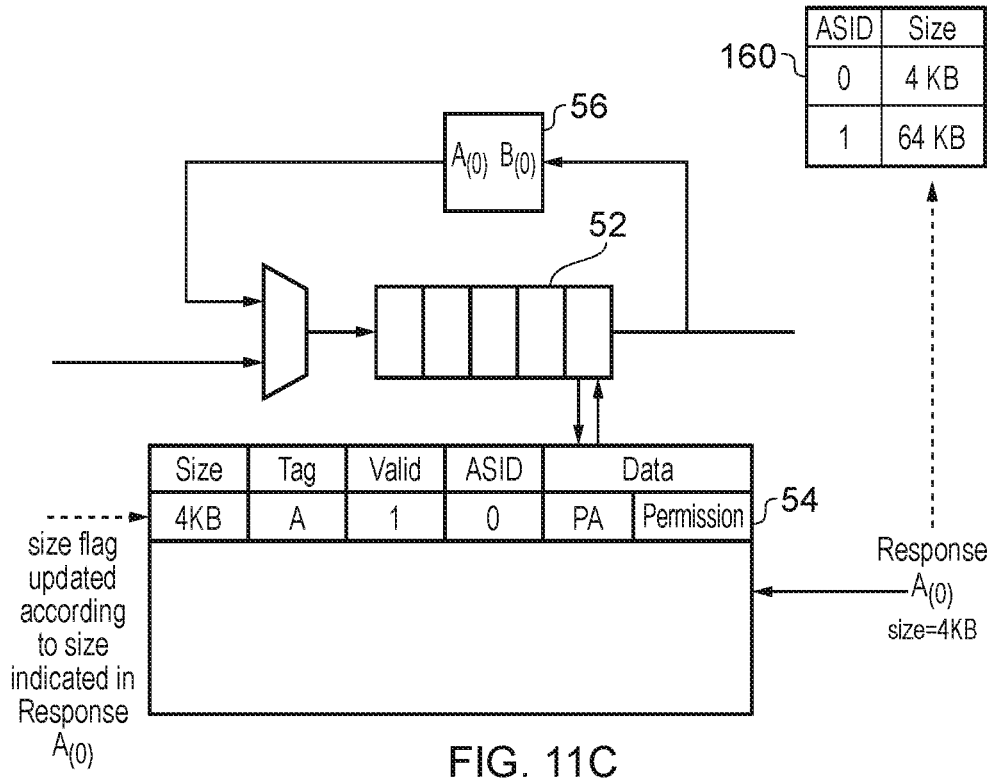

As shown in FIG. 11C, the response for address A¬(0) is received from the main TLB 10 which also includes the current granule size. In this case it is 4 KB, so the size flag in the cache line associated with A and the value in size indicator 160 corresponding to address space 0 are updated accordingly. The address translation data, for example a corresponding physical page address for address A and access permissions, is then stored in the cache and the valid bit is set to '1'.

Figure 11D:
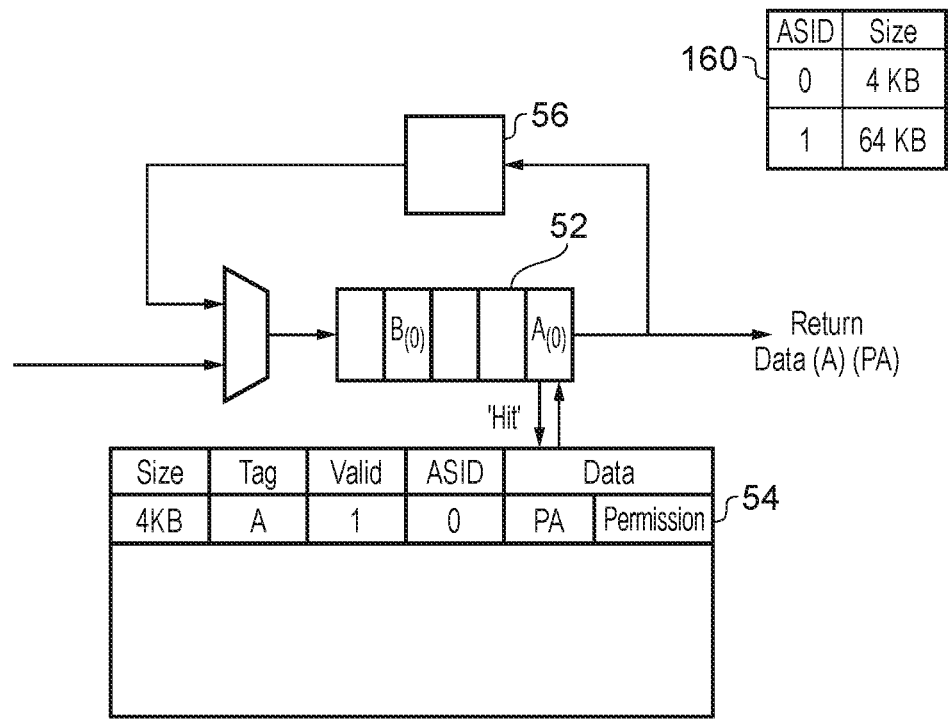

At a later time, requests A(0) and B(0) return from the replay buffer 56 to the cache access circuitry 52. As shown in FIG. 11D, the cache 54 is once again searched for data corresponding to A¬(0) and a hit occurs. As a hit has occurred, and the valid bit is '1', the data stored in the cache 54 is used to translate address A and determine whether the access to address A is permitted, and if so the translated address is then returned to the shader core for processing.

Figure 11E:
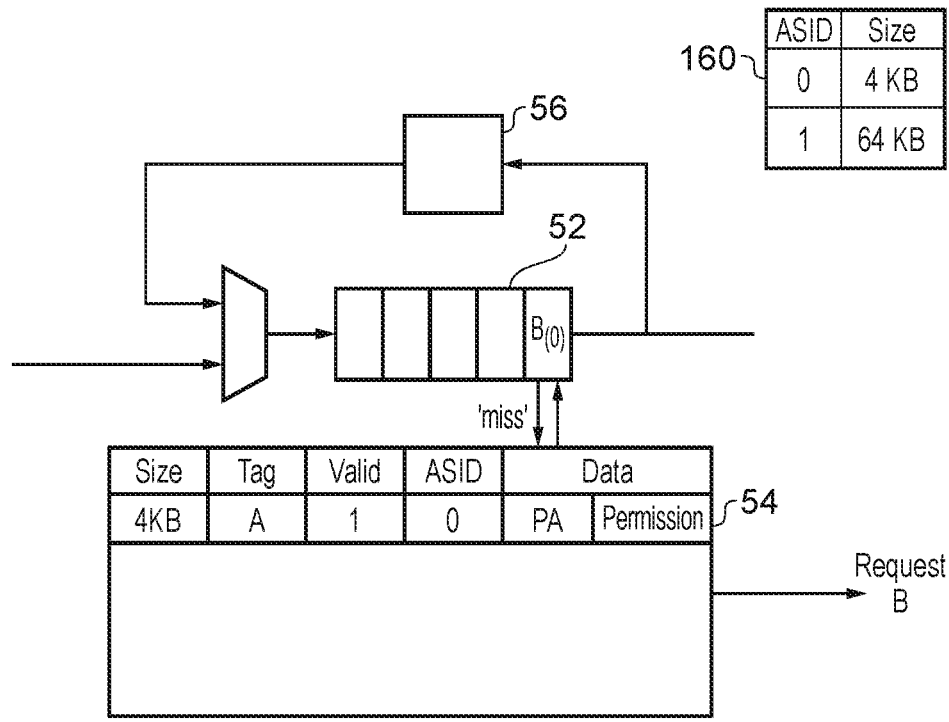
Figure 11F:
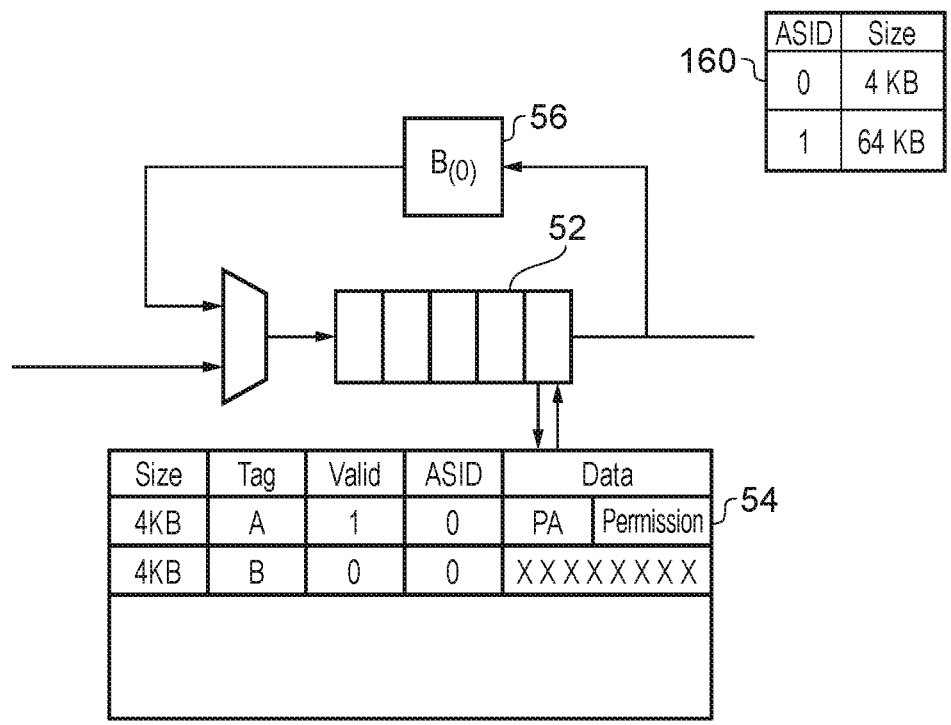

Similarly, as shown in FIG. 11E, the cache 54 is also searched again for data corresponding to address B, however, this time, as the granule size is known to be 4 KB, and the size flag in the cache line storing data associated with address A has been updated, a larger portion of bits are compared in the comparison between address B and tag A. As these portions of bits are not identical, some of the less significant bits which are compared differ and hence a miss occurs. Therefore request B(0) is returned to the replay buffer 56 for a second time and a request for data corresponding to address is initiated to the main TLB 10. As a miss has occurred based on the known granule size, only at this point is an allocation made in the cache for the data as shown in FIG. 11 F. It is evident at this stage that allocations are not made in the cache for subsequent requests which correspond to the same 64 KB block as the original request unless it is known that the granule size is smaller. In this way the cache 54 is not filled with allocated entries which may have turned out to be unnecessary and the cache access circuitry 52 is kept relatively clear, improving the performance of other requests to different 64 KB blocks which may still allocate in the cache 54.

Figure 11G:
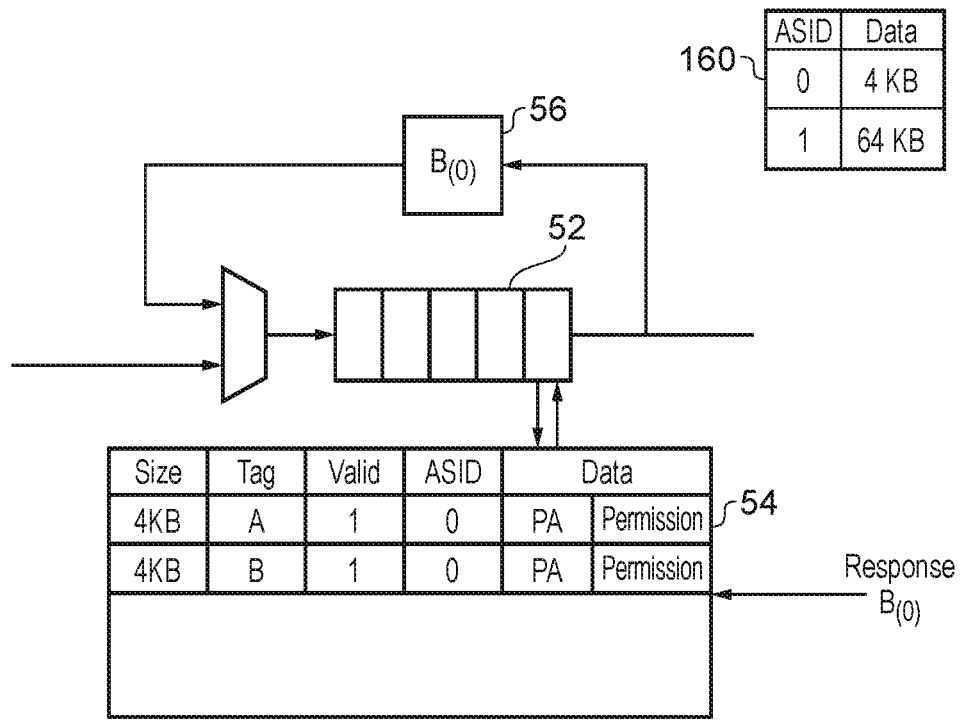
Figure 11H:
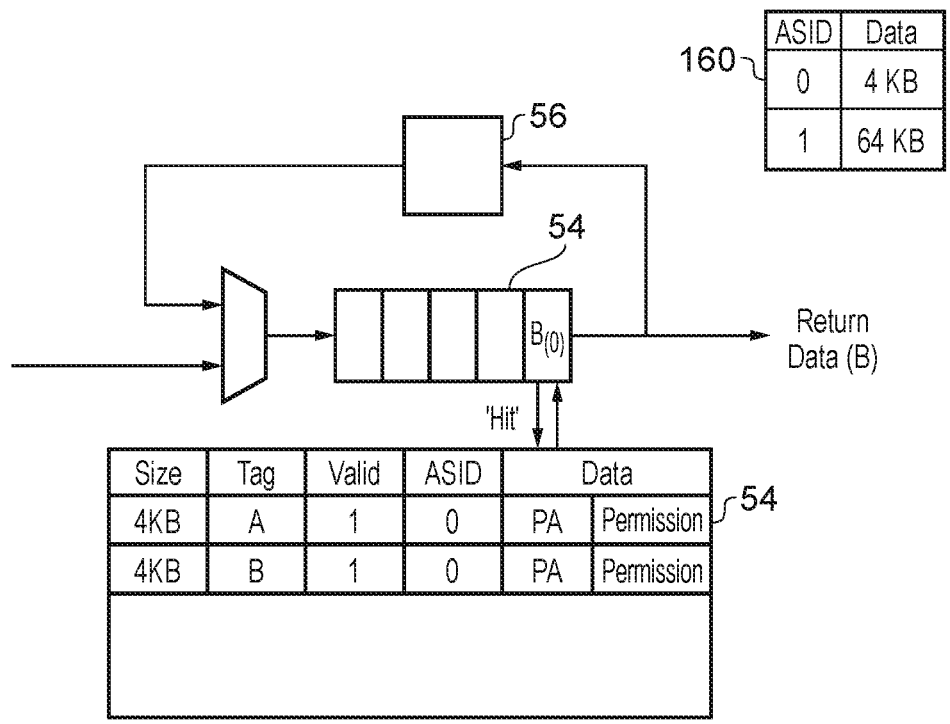

Once the data is returned from the main TLB 10 for request B¬(0), the cache 54 entry for that request is populated with the data, as shown in FIG. 11G, and on the subsequent pass through the cache access circuitry 52 a hit will occur and the data corresponding to B(0) will be used to generate a translated address which is returned to the shader core 4 as shown in FIG. 11 H.

It will be appreciated that the apparatus 22 may be configured to handle multiple address spaces, and similarly the storage indicator 160 may be configured to store a plurality of granule sizes, each corresponding to a certain address space. In the example described above, all requests corresponded to address space (0). However, the apparatus 22 is also configured to service requests corresponding to other address spaces such as address space (1).

While for ease of understanding the above figures show the size indicators 160 and cache entry size flags in the form "4 KB" and "64 KB" to indicate the corresponding granule sizes, it will be appreciated that in practice these may be represented with corresponding identifiers in binary form.

Figure 12:
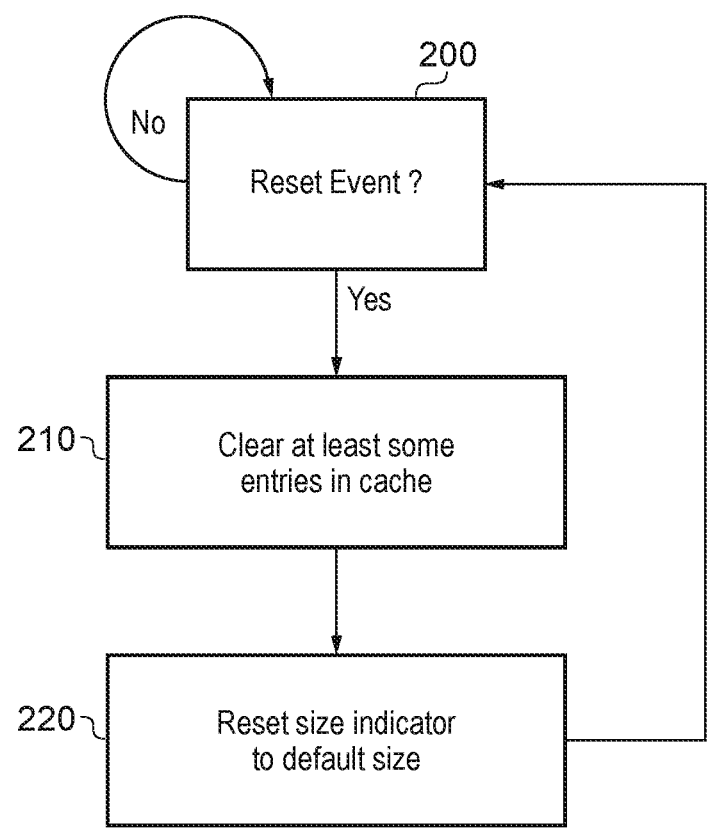
FIG. 12 illustrates a method of resetting a cache and a size indicator.

FIG. 12 is a flow diagram showing the process of the shader core 4 in response to a reset event. At step 200 the shader core 4 monitors whether a reset event has occurred. Should such an event occur, for example, an invalidation event or a context switch or a wakeup from a power saving state, the cache proceeds to step 210 and invalidates (clears, or marks as invalid) at least some of its entries. For example, an invalidation signal may indicate that all entries corresponding to address space 0 are now invalid, in which case all such entries will be cleared whilst entries corresponding to address space 1 will not. On the other hand, a full invalidation may indicate that all entries are to be made invalid, in which case all entries in the cache will be invalidated. The size indicator is updated in step 220 to a default size for at least the address space(s) being invalidated, and the process returns to step 200. As described earlier the default size is greater than at least one of the plurality of granule sizes. The steps of FIG. 12 may be performed by a cache controller for controlling the uTLB 22 in some examples, or by some other control circuitry within the shader core 4.

Figure 13:
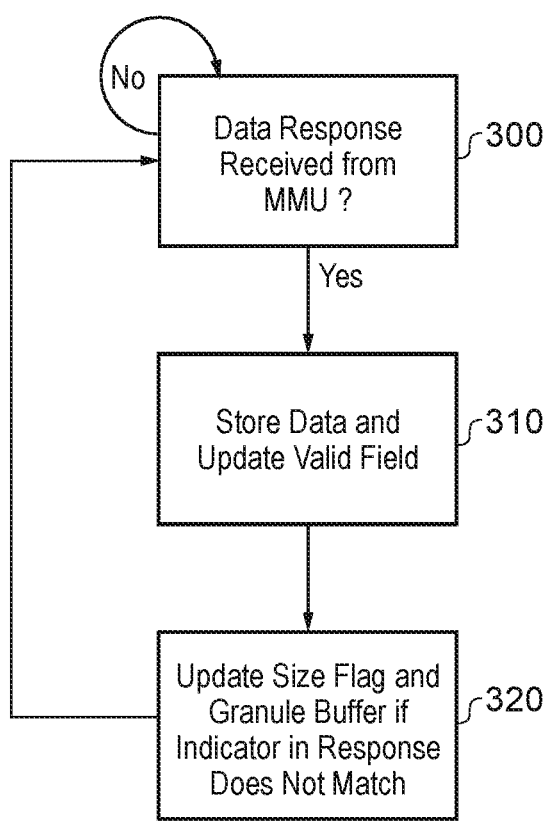
FIG. 13 illustrates a method of receiving a size indicator in a data response.

FIG. 13 is a flow diagram showing a process performed by the uTLB 22 upon receiving a response from the main TLB of the MMU 8 providing a requested page table entry. In step 300, the response is received from the MMU 8. The apparatus then advances to step 310 and stores the data in the corresponding entry of the uTLB 22. At this point the valid field is also updated to mark the stored data as valid. In step 320 a check is made to see whether the size indicator contained in the response matches the size flag in the cache and the size stored in the granule buffer 160. If there is not a match, the size flag and the granule buffer are updated to correspond to the size indicator contained in the response. The process then returns to step 300. According to the example of FIG. 13, each response provided by the MMU 8 may include the size indicator, but in other examples only the first response provided following an invalidation event or other reset event may include the size indicator.

Figure 14:
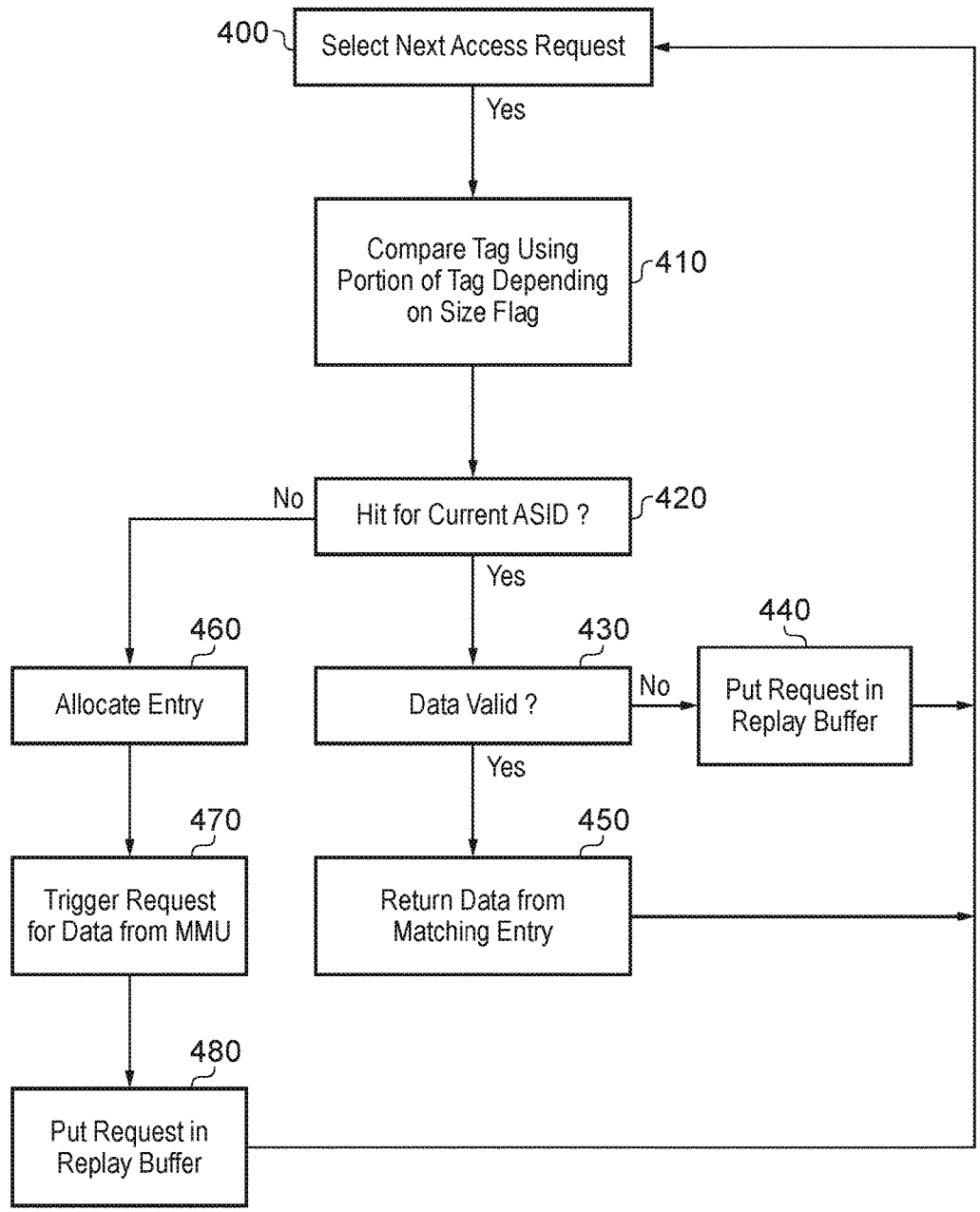
FIG. 14 illustrates a method of processing an access request.

FIG. 14 is a flow diagram of a method of processing an access request according to the present technique, which may be performed by the uTLB 22. At step 400 the uTLB 22 selects the next access request to be serviced. Upon selecting an access request, the process proceeds to step 410 where a tag portion of the address contained in the access request is compared to the tags stored in each entry. Each entry stores the size of the block of addresses corresponding to the data, an address space identifier (ASID), a valid field and the data itself. Therefore the tag comparison between the address contained in the cache request and the cached data may be performed based upon these values such that the number of bits of each tag to be compared is dependent on the block size and a hit is detected if the compared portion of the tag and address match and the stored ASID matches the ASID specified in the access request. The result of the comparison is assessed at step 420, and if a hit occurs, the method proceeds to step 430. At step 430 a check is made as to whether the data stored in the corresponding entry is valid. If the data is valid the process moves on to step 450 where the valid data is returned from the matching entry, and used to perform the address translation. However, if the data is not valid, the process instead proceeds to step 490, where the request is placed in the replay buffer to retry later.

On the other hand, should a miss occur at step 420, the process instead proceeds to step 460. At step 460 an entry is allocated in the cache for the request with the size field determined based on the size stored in the granule buffer 160, and a request for the corresponding data is sent to the MMU as shown in step 470. The request is then transferred to a replay buffer in step 480 to await the return of the data. Any requests which are transferred to the replay buffer in step 480 or 490 will eventually appear as access requests again at step 400 and trigger the process again.

It will be appreciated that a µTLB 22 is just one example of a cache, and that the method of assuming a default size discussed above may be applied to any cache which is configured to store entries corresponding to blocks of addresses of variable sizes. For example, an apparatus configured to operate at a plurality of security levels, including at least a secure level and a non-secure level, may have a cache for defining whether regions of an address space can be accessed in the secure or non-secure levels. In this case, the granularity at which regions can be defined as secure or non-secure may be variable so that there are different options for selecting the size of blocks of addresses associated with a particular secure table entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

We claim:

1. A data processing apparatus comprising:
a plurality of caches;
a controller configured to control the plurality of caches;
a first network coupling the controller and the plurality of caches; and
a second network coupling the controller and the plurality of caches;
wherein the controller is configured to transmit a unicast communication to a specified one of the plurality of caches via the first network; and
the controller is configured to transmit a multicast communication to at least two of the plurality of caches via the second network,
wherein the multicast communication comprises a cache invalidation request for requesting invalidation of at least some data stored in said at least two caches, and wherein in response to a cache refill request received from a requesting cache of said plurality of caches via the first network, the cache refill request specifying target data to be provided in a cache refill response to the requesting cache via the first network, the controller is configured to initiate a line fill request to fetch the target data from a data store when the target data is not already available to the controller.

2. The data processing apparatus according to claim 1, wherein the multicast communication comprises a broadcast communication to each of the plurality of caches.

3. The data processing apparatus according to claim 1, wherein the first network comprises a switch network providing a plurality of communication paths between the controller and any given cache.

4. The data processing apparatus according to claim 1, wherein the second network is configured to provide asynchronous communication between the controller and the plurality of caches.

5. The data processing apparatus according to claim 1, wherein the unicast communication comprises a cache refill response providing data to be stored in said specified one of said plurality of caches.

6. The data processing apparatus according to claim 1, wherein in response to the cache invalidation request, each of said at least two caches is configured to transmit a cache invalidation response to the controller via the second network.

7. The data processing apparatus according to claim 6, wherein in response to detecting that each of said at least two caches has transmitted said cache invalidation response, the controller is configured to deassert the cache invalidation request.

8. The data processing apparatus according to claim 6, wherein each of said at least two caches is configured to deassert the cache invalidation response when the cache has completed an invalidation process in response to the cache invalidation request.

9. The data processing apparatus according to claim 8, wherein the controller is configured to defer issuing of a further cache invalidation request on the second network until each of said at least two caches has deasserted said cache invalidation response.

10. The data processing apparatus according to claim 6, wherein at least one of said caches comprises response generating circuitry configured to generate the cache invalidation response in response to the cache invalidation request when the cache is in a power saving state.

11. The data processing apparatus according to claim 1, wherein the multicast communication transmitted to the at least two caches via the second network also comprises identification information identifying which data is to be invalidated in response to said cache invalidation request.

12. The data processing apparatus according to claim 11, wherein the identification information identifies at least one of:

an address or group of addresses of data to be invalidated;
an address space associated with data to be invalidated; and
a context associated with data to be invalidated.

13. The data processing apparatus according to claim 1, wherein the controller is configured to transmit the cache invalidation request in response to receiving an invalidation control signal from another device.

14. The data processing apparatus according to claim 13, wherein in response to the cache invalidation request, each of said at least two caches is configured to transmit a cache invalidation response to the controller via the second network; and
when, after transmission of the cache invalidation request, a further invalidation control signal is received from the other device, the controller is configured to suppress issuing of a further cache invalidation request in response to the further invalidation control signal if the cache invalidation response has not yet been received from each of the at least two caches.

15. The data processing apparatus according to claim 1, wherein the controller is configured to discard target data fetched from the data store in response to at least one line fill request pending at the time of issuing the cache invalidation request.

16. The data processing apparatus according to claim 1, wherein the controller is configured to provide the cache refill response in response to cache refill requests pending at the time of issuing the cache invalidation request.

17. The data processing apparatus according to claim 1, wherein in response to the cache invalidation request, said at least two caches are configured to identify at least one outstanding cache refill request for which the cache refill response has not yet been provided by the controller, and to discard target data provided by the controller in response to said at least one outstanding cache refill request.

18. The data processing apparatus according to claim 17, wherein in response to the cache invalidation request, said at least two caches are configured to reissue said at least one outstanding cache refill request to said controller.

19. The data processing apparatus according to claim 1, wherein the plurality of caches comprise a plurality of translation lookaside buffers configured to store address translation data.

20. The data processing apparatus according to claim 1, wherein the controller comprises a memory management unit.

21. A controller for controlling a plurality of caches of a data processing apparatus, comprising:
a first network interface configured to output a unicast communication to a specified one of the plurality of caches via a first network; and
a second network interface configured to output a multicast communication to at least two of the plurality of caches via a second network;
wherein the multicast communication comprises a cache invalidation request for requesting invalidation of at least some data stored in said at least two caches, and wherein in response to a cache refill request received from a requesting cache of said plurality of caches via the first network, the cache refill request specifying target data to be provided in a cache refill response to the requesting cache via the first network, the controller is configured to initiate a line fill request to fetch the target data from a data store when the target data is not already available to the controller.

22. A cache comprising:
a first network interface configured to receive a unicast communication from a controller via a first network, the unicast communication comprising a type of communication for which said cache is the only recipient; and
a second network interface configured to receive a multicast communication from the controller via a second network, the multicast communication comprising a type of communication for which recipients include said cache and at least one other cache;
wherein the multicast communication comprises a cache invalidation request for requesting invalidation of at least some data stored in said at least two caches, wherein in response to the cache invalidation request, each of said at least two caches is configured to transmit a cache invalidation response to the controller via the second network; and
wherein at least one of said caches comprises response generating circuitry configured to generate the cache invalidation response in response to the cache invalidation request when the cache is in a power saving state.

23. A data processing method comprising:
transmitting a unicast communication from a controller to a specified one of a plurality of caches via a first network coupling the controller and the plurality of caches; and
transmitting a multicast communication to at least two of the plurality of caches via a second network coupling the controller and the plurality of caches,
wherein the multicast communication comprises a cache invalidation request for requesting invalidation of at least some data stored in said at least two caches, and wherein in response to a cache refill request received from a requesting cache of said plurality of caches via the first network, the cache refill request specifying target data to be provided in a cache refill response to the requesting cache via the first network, the controller initiates a line fill request to fetch the target data from a data store when the target data is not already available to the controller.

* * * * *